United States Patent
Hoshi

(10) Patent No.: US 11,682,778 B2
(45) Date of Patent: Jun. 20, 2023

(54) FUEL CELL SYSTEM AND CONTROL METHOD FOR FUEL CELL SYSTEM

(71) Applicants: NISSAN MOTOR CO., LTD., Yokohama (JP); CELLCENTRIC GMBH & CO.KG, Kirchheim Unter Teck (DE)

(72) Inventor: Kiyoshi Hoshi, Kanagawa (JP)

(73) Assignees: NISSAN MOTOR CO., LTD., Yokohama (JP); CELLCENTRIC GMBH & CO.KG, Kirchheim Unter Teck (DE)

(*) Notice: Subject to any disclaimer, the term of this patent is extended or adjusted under 35 U.S.C. 154(b) by 149 days.

(21) Appl. No.: 15/327,457

(22) PCT Filed: Jun. 3, 2015

(86) PCT No.: PCT/JP2015/066049
§ 371 (c)(1),
(2) Date: Jan. 19, 2017

(87) PCT Pub. No.: WO2016/013304
PCT Pub. Date: Jan. 28, 2016

(65) Prior Publication Data
US 2017/0187053 A1 Jun. 29, 2017

(30) Foreign Application Priority Data
Jul. 24, 2014 (JP) .............................. JP2014-151272

(51) Int. Cl.
| H01M 8/04223 | (2016.01) |
| H01M 8/04089 | (2016.01) |
| H01M 8/04228 | (2016.01) |
| H01M 8/04492 | (2016.01) |
| H01M 8/04303 | (2016.01) |
| H01M 8/04701 | (2016.01) |
| H01M 8/04828 | (2016.01) |
| H01M 8/04291 | (2016.01) |
| H01M 8/0432  | (2016.01) |
| H01M 8/04992 | (2016.01) |
| H01M 8/10    | (2016.01) |
| H01M 8/04119 | (2016.01) |

(52) U.S. Cl.
CPC ..... *H01M 8/04253* (2013.01); *H01M 8/0485* (2013.01); *H01M 8/04097* (2013.01); *H01M 8/04228* (2016.02); *H01M 8/04291* (2013.01); *H01M 8/04303* (2016.02); *H01M 8/04328* (2013.01); *H01M 8/04373* (2013.01); *H01M 8/04529* (2013.01); *H01M 8/04738* (2013.01); *H01M 8/04992* (2013.01); *H01M 8/04164* (2013.01); *H01M 2008/1095* (2013.01); *H01M 2250/20* (2013.01); *Y02T 90/40* (2013.01)

(58) Field of Classification Search
None
See application file for complete search history.

(56) References Cited

U.S. PATENT DOCUMENTS

| 5,798,186 | A  | * | 8/1998  | Fletcher   | ............ | H01M 8/04007 |
|           |    |   |         |            |              | 429/429      |
| 2006/0093880 | A1 | * | 5/2006  | Igarashi   | ............ | H01M 8/04358 |
|           |    |   |         |            |              | 429/429      |
| 2006/0105209 | A1 |   | 5/2006  | Thyroff et al. | | |
| 2006/0141309 | A1 | * | 6/2006  | Miyata     | .............. | H01M 8/04268 |
|           |    |   |         |            |              | 429/429      |
| 2007/0042235 | A1 | * | 2/2007  | Kagami     | .............. | H01M 8/0491  |
|           |    |   |         |            |              | 429/432      |
| 2007/0141418 | A1 | * | 6/2007  | Ota        | ................... | H01M 8/04253 |
|           |    |   |         |            |              | 429/444      |
| 2007/0298289 | A1 | * | 12/2007 | Clingerman | ...... | H01M 8/04223 |
|           |    |   |         |            |              | 429/429      |
| 2009/0169928 | A1 | * | 7/2009  | Nishimura  | ........ | H01M 8/04738 |
|           |    |   |         |            |              | 429/415      |
| 2010/0028728 | A1 | * | 2/2010  | Clingerman | ...... | H01M 8/04126 |
|           |    |   |         |            |              | 429/411      |
| 2011/0003215 | A1 |   | 1/2011  | Tanaka et al. | | |
| 2012/0237844 | A1 |   | 9/2012  | Muetschele et al. | | |
| 2013/0149628 | A1 | * | 6/2013  | Ogawa      | .............. | H01M 8/04492 |
|           |    |   |         |            |              | 429/450      |
| 2015/0349360 | A1 |   | 12/2015 | Hoshi      | | |

FOREIGN PATENT DOCUMENTS

| DE | 10 2011 114 797 A1 | 4/2013 |
| JP | 2006-79864 A       | 3/2006 |
| JP | 2006-169977 A      | 6/2006 |
| JP | 2006-202543 A      | 8/2006 |
| JP | 2007-226986 A      | 9/2007 |
| JP | 2007-305334 A      | 11/2007 |
| JP | 2010-3493 A        | 1/2010 |
| JP | 2010-170926 A      | 8/2010 |
| JP | 2010-287518 A      | 12/2010 |
| JP | 2013-506258 A      | 2/2013 |
| WO | WO 2008/056617 A1  | 5/2008 |
| WO | WO-2014/109239 A1  | 7/2014 |

* cited by examiner

*Primary Examiner* — Anca Eoff
(74) *Attorney, Agent, or Firm* — Foley & Lardner LLP

(57) ABSTRACT

A fuel cell system for supplying anode gas and cathode gas to a fuel cell and causing the fuel cell to generate power according to a load includes a component that circulates discharged gas of either the anode gas or the cathode gas discharged from the fuel cell to the fuel cell. The fuel cell system includes a power generation control unit that controls a power generation state of the fuel cell on the basis of the load, a freezing prediction unit that predicts the freezing of the component on the basis of a temperature of the fuel cell system. The fuel cell system includes an operation execution unit that executes a warm-up operation without stopping the fuel cell system or after the stop of the fuel cell system in the case of receiving a stop command of the fuel cell system when the freezing of the component is predicted.

23 Claims, 15 Drawing Sheets

FUEL CELL SYSTEM AND CONTROL METHOD FOR FUEL CELL SYSTEM

TECHNICAL FIELD

This invention relates to a fuel cell system for circulating gas discharged from a fuel cell to the fuel cell and a control method for fuel cell system.

BACKGROUND ART

JP2010-3493A discloses a fuel cell system for scavenging an anode gas flow passage when a temperature of anode off-gas discharged from a fuel cell drops below a predetermined temperature during the stop of the fuel cell system.

SUMMARY OF INVENTION

A fuel cell system mounted in a vehicle may be started at a sub-zero temperature of, e.g. −30° C. depending on a use environment. In such a case, steam in anode off-gas is frozen to generate ice in a flow passage when anode gas supplied from a high-pressure tank and the anode off-gas join in the fuel cell system for circulating the anode off-gas to a fuel cell.

Thus, even if the anode gas flow passage is scavenged during the stop of the fuel cell stack as described above, ice formed in the flow passage remains without being removed. If the fuel cell system is restarted with ice remaining, ice is further generated on the remaining ice and the flow passage is closed, whereby it may not be possible to supply the gas to the fuel cell.

The present invention was developed, focusing on such a problem, and aims to provide a fuel cell system for preventing the freezing of a flow passage for gas circulated through a fuel cell during sub-zero start and a control method for fuel cell system.

According to one aspect of the present invention, a fuel cell system supplies anode gas and cathode gas to a fuel cell and causes the fuel cell to generate power according to a load. The fuel cell system includes a component configured to circulate, through the fuel cell, discharged gas of either the anode gas or the cathode gas discharged from the fuel cell to the fuel cell, a power generation control unit configured to control a power generation state of the fuel cell on the basis of the load, and a freezing prediction unit configured to predict the freezing of the component by a sensor configured to detect a temperature of the fuel cell system. The fuel cell system includes an operation execution unit configured to execute a warm-up operation without stopping the fuel cell system or after the stop of the fuel cell system in the case of receiving a stop command of the fuel cell system when the freezing of the component is predicted.

DESCRIPTION OF EMBODIMENTS

Hereinafter, embodiments of the present invention are described with reference to the accompanying drawings.

First Embodiment

Figure 1:
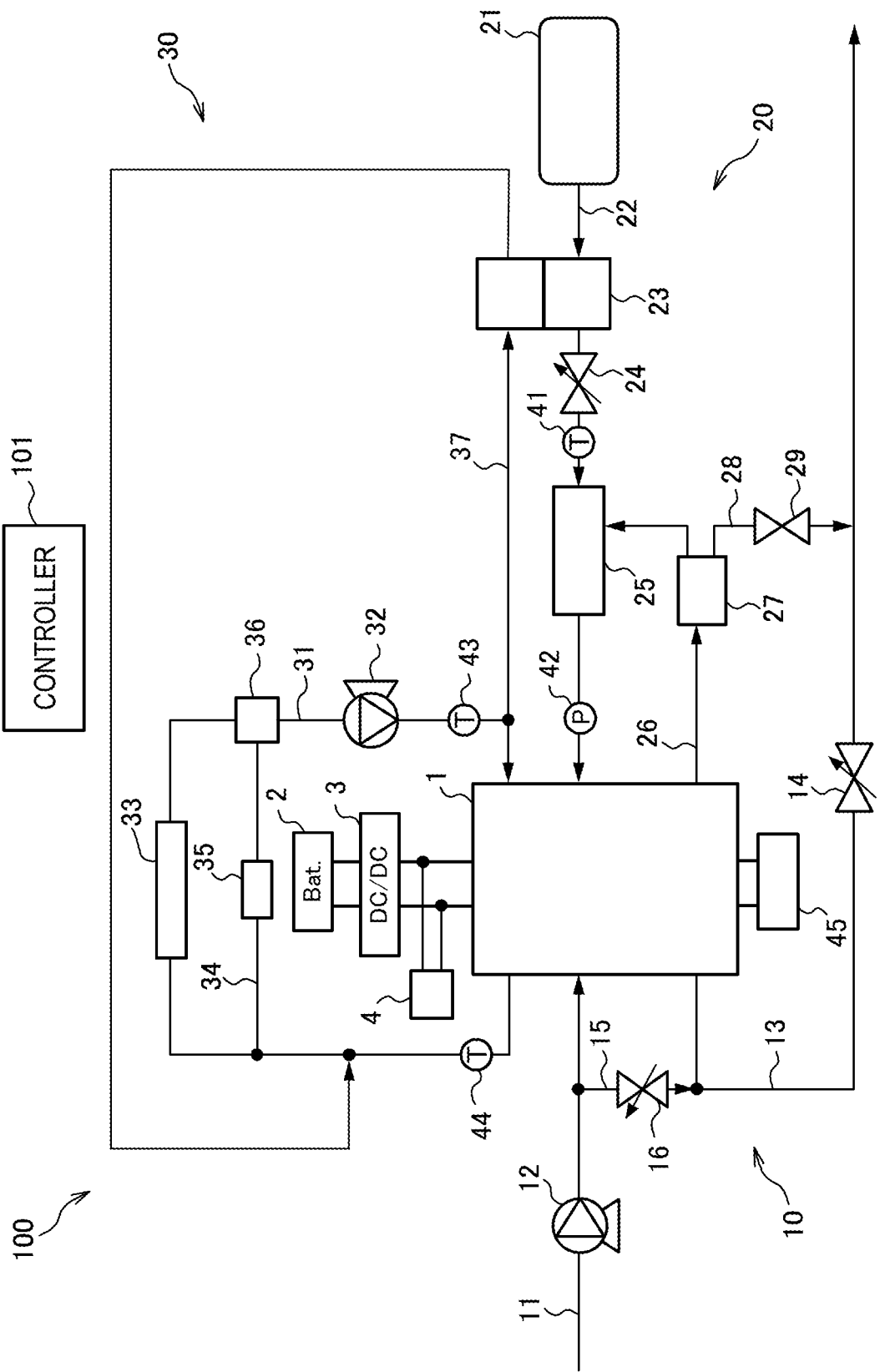
FIG. 1 is a diagram showing the configuration of a fuel cell system in an embodiment of the present invention.

FIG. 1 is a diagram showing a configuration example of a fuel cell system in an embodiment of the present invention.

A fuel cell system 100 constitutes a power supply system for supplying fuel gas necessary for power generation from outside to a fuel cell and causing the fuel cell to generate power according to an electric load. The fuel cell system 100 is controlled by a controller 101.

The fuel cell system 100 includes a fuel cell stack 1, a battery 2, a DC/DC converter 3, electric load 4, a cathode gas supplying/discharging device 10, an anode gas supplying/discharging device 20, a stack cooling device 30 and a stack resistance measuring device 45. Each of the cathode gas supplying/discharging device 10, the anode gas supplying/discharging device 20 and the stack cooling device 30 is an auxiliary machine used for causing the fuel cell stack 1 to generate power.

The battery 2 is a power supply for assisting the fuel cell stack 1. The battery 2 outputs a voltage of, e.g. several hundreds of V.

The DC/DC converter 3 is a bidirectional voltage converter for adjusting a voltage of the fuel cell stack 1 and a voltage of the battery 2 with respect to each other. The DC/DC converter 3 is connected between the fuel cell stack 1 and the battery 2. The DC/DC converter 3 is controlled by the controller 101 and adjusts the voltage of the fuel cell stack 1 using power output from the battery 2.

For example, the DC/DC converter 3 reduces the voltage of the fuel cell stack 1 such that an output current taken out from the fuel cell stack 1 increases as power required from the electric load 4 increases.

The electric load 4 is driven by power supplied from the fuel cell stack 1 and the battery 2. Examples of the electric load 4 include an electric motor for driving a vehicle and some of auxiliary machines of the fuel cell stack 1.

In the present embodiment, the electric load 4 is connected to a power supply line connecting the fuel cell stack 1 and the DC/DC converter 3. It should be noted that the electric motor may be connected to the power supply line between the fuel cell stack 1 and the DC/DC converter 3 and some of the auxiliary machines may be connected to the power supply line between the battery 2 and the DC/DC converter 3.

The fuel cell stack 1 is such that several hundreds of battery cells are laminated, and generates a DC voltage of, e.g. several hundreds of V (volts).

A fuel cell is composed of an anode electrode (fuel electrode), a cathode electrode (oxidant electrode) and an electrolyte membrane sandwiched between the anode electrode and the cathode electrode. In the fuel cell, anode gas (fuel gas) containing hydrogen in the anode electrode and cathode gas (oxidant gas) containing oxygen in the cathode electrode induce an electrochemical reaction (power generation reaction) in the electrolyte membrane. The following electrochemical reactions proceed in both anode and cathode electrodes.

Anode electrode: $2H_2 \rightarrow 4H^+ + 4e^-$ (1)

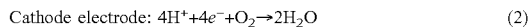

Cathode electrode: $4H^+ + 4e^- + O_2 \rightarrow 2H_2O$ (2)

By the above electrochemical reactions (1) and (2), an electromotive force is generated and, simultaneously, water is generated. Since each of the fuel cells laminated in the fuel cell stack 1 is connected in series, a total of cell voltages generated in the fuel cells becomes an output voltage of the fuel cell stack 1.

The cathode gas is supplied to the fuel cell stack 1 from the cathode gas supplying/discharging device 10 and the anode gas is supplied thereto from the anode gas supplying/discharging device 20.

The cathode gas supplying/discharging device 10 is a device configured to supply the cathode gas to the fuel cell stack 1 and discharge cathode off-gas discharged from the fuel cell stack 1 to atmosphere. The cathode off-gas contains excess cathode gas not consumed by the fuel cell stack 1 and impurities such as generated water associated with power generation.

The cathode gas supplying/discharging device 10 includes a cathode gas supply passage 11, a compressor 12, a cathode gas discharge passage 13, a cathode pressure control value 14, a bypass passage 15 and a bypass valve 16.

The cathode gas supply passage 11 is a passage for supplying the cathode gas to the fuel cell stack 1. One end of the cathode gas supply passage 11 communicates with a passage for taking in air containing oxygen from outside air and the other end is connected to a cathode gas inlet hole of the fuel cell stack 1.

The compressor 12 is provided in the cathode gas supply passage 11. The compressor 12 takes air into the cathode gas supply passage 11 from outside air and supplies the air as the cathode gas to the fuel cell stack 1. The compressor 12 is controlled by the controller 101.

The cathode gas discharge passage 13 is a passage for discharging the cathode off-gas from the fuel cell stack 1. One end of the cathode gas discharge passage 13 is connected to a cathode gas outlet hole of the fuel cell stack 1 and the other end is open.

The cathode pressure control value 14 is provided in the cathode gas discharge passage 13. In the present embodiment, an electromagnetic valve capable of changing a valve opening degree in a stepwise manner is used as the cathode pressure control valve 14. The cathode pressure control value 14 is controlled to open and close by the controller 101. By this open/close control, a pressure of the cathode gas to be supplied to the fuel cell stack 1 is adjusted to a desired pressure.

The bypass passage 15 is a passage for directly discharging part of the cathode gas discharged from the compressor 12 to the cathode gas discharge passage 13 without supplying it to the fuel cell stack 1.

One end of the bypass passage 15 is connected to a part of the cathode gas supply passage 11 between the compressor 12 and the fuel cell stack 1 and the other end is connected to a part of the cathode gas discharge passage 13 upstream of the cathode pressure control value 14. Specifically, the bypass passage 15 is branched off from the cathode gas supply passage 11 at a position downstream of the compressor 12 and joins the cathode gas discharge passage 13 at a position upstream of the cathode pressure control valve 14.

The bypass valve 16 is provided in the bypass passage 15. In the present embodiment, an electromagnetic valve capable of changing a valve opening degree in a stepwise manner is used as the bypass valve 16. The bypass valve 16 is controlled by the controller 101.

The bypass valve 16 is opened, for example, when a flow rate of the cathode gas necessary to dilute hydrogen discharged from the fuel cell stack 1 (hereinafter, referred to as a "hydrogen dilution request flow rate") becomes larger than a flow rate of the cathode gas necessary for the power generation of the fuel cell stack 1.

Alternatively, the bypass valve 16 is opened when a flow rate of the cathode gas necessary to avoid a surge occurring in the compressor 12 (hereinafter, referred to as a "surge avoidance request flow rate") becomes larger than the flow rate of the cathode gas necessary for the power generation of the fuel cell stack 1.

It should be noted that the bypass valve 16 is closed when the flow rate of the cathode gas necessary for the power generation of the fuel cell stack 1 is larger than values such as the hydrogen dilution request flow rate and the surge avoidance request flow rate.

The anode gas supplying/discharging device 20 is a device configured to supply the anode gas to the fuel cell stack 1 and remove impurities in anode off-gas discharged from the fuel cell stack 1 while circulating the anode off-gas to the fuel cell stack 1. The impurities mean nitrogen in air permeating from the cathode electrodes to the anode electrodes via the electrolyte membranes, generated water associated with power generation and the like.

The anode gas supplying/discharging device 20 includes a high-pressure tank 21, an anode gas supply passage 22, a heat exchanger 23, an anode pressure control value 24, a jet pump 25, an anode gas circulation passage 26, a gas-liquid separation device 27, a purge passage 28 and a purge valve 29.

The high-pressure tank 21 stores the anode gas to be supplied to the fuel cell stack 1 in a high-pressure state.

The anode gas supply passage 22 is a passage for supplying the anode gas stored in the high-pressure tank 21 to the fuel cell stack 1. One end of the anode gas supply passage 22 is connected to the high-pressure tank 21 and the other end is connected to an anode gas inlet hole of the fuel cell stack 1.

The heat exchanger 23 is provided upstream of the anode pressure control valve 24 in the anode gas supply passage 22. The heat exchanger 23 exchanges heat between cooling water increased in temperature in the fuel cell stack 1 and the anode gas supplied from the high-pressure tank 21. The cooling water is refrigerant for cooling the fuel cell stack 1.

When the fuel cell system 100 is started at a low temperature, the heat exchanger 23 has a function of warming the anode gas to be supplied to the anode gas supply passage 22 by the cooling water circulating through the fuel cell stack 1.

The anode pressure control value 24 is provided between the heat exchanger 23 and the jet pump 25 in the anode gas supply passage 22. In the present embodiment, an electromagnetic valve capable of changing a valve opening degree in a stepwise manner is used as the anode pressure control valve 24. The anode pressure control value 24 is controlled to open and close by the controller 101. By this open/close control, a pressure of the anode gas to be supplied to the fuel cell stack 1 is adjusted.

A temperature sensor 41 configured to detect a temperature of the anode gas supplied from the high-pressure tank 21 (hereinafter, referred to as a "supplied gas temperature") is provided between the anode pressure control valve 24 and the jet pump 25 in the anode gas supply passage 22. The temperature sensor 41 outputs a detection signal indicating the detected temperature to the controller 101.

It should be noted that although the temperature sensor 41 is provided between the anode pressure control valve 24 and the jet pump 25 in the anode gas supply passage 22 in the present embodiment, it may be provided between the heat exchanger 23 and the anode pressure control valve 24 in the anode gas supply passage 22.

The jet pump 25 is provided between the anode pressure control valve 24 and the fuel cell stack 1 in the anode gas supply passage 22. The jet pump 25 is a pump or ejector for causing the anode gas circulation passage 26 to join the anode gas supply passage 22. By using the jet pump 25, the anode off-gas can be circulated to the fuel cell stack 1 by a simple configuration.

The jet pump 25 sucks the anode off-gas discharged from the fuel cell stack 1 and circulates that anode off-gas to the fuel cell stack 1 by increasing a flow velocity of the anode gas supplied by the anode pressure control valve 24.

The jet pump 25 is composed, for example, of a nozzle and a diffuser. The nozzle is for accelerating the flow velocity of the anode gas and injecting the anode gas to the diffuser. The nozzle is formed into a hollow cylindrical shape and an opening is narrowed toward a tip part of the nozzle. Thus, the flow velocity of the anode gas is increased in the tip part and the anode gas is injected into the diffuser.

The diffuser is for sucking the anode off-gas by the flow velocity of the anode gas injected from the nozzle. The diffuser causes the anode gas injected from the nozzle and the sucked anode off-gas to join and discharges gas after joining to the fuel cell stack 1. The diffuser is formed with a confluent passage on the same axis as the nozzle. An opening of the confluent passage is formed to be wider toward a discharge port. The diffuser is formed with a hollow cylindrical suction chamber extending from a suction port to the tip part of the nozzle and the suction chamber and the confluent passage communicate.

A pressure sensor 42 is provided between the jet pump 25 and the fuel cell stack 1 in the anode gas supply passage 22. The pressure sensor 42 detects a pressure of the anode gas to be supplied to the fuel cell stack 1 (hereinafter, referred to as a "stack inlet gas pressure"). The pressure sensor 42 outputs a detection signal indicating the detected pressure to the controller 101.

The anode gas circulation passage 26 is a passage for circulating the anode off-gas discharged from the fuel cell stack 1 to the anode gas supply passage 22. One end of the anode gas circulation passage 26 is connected to an anode gas outlet hole of the fuel cell stack 1 and the other end is connected to the suction port (circulation port) of the jet pump 25.

The liquid-gas separation device 27 is provided in the anode gas circulation passage 26. The liquid-gas separation device 27 separates impurities such as generated water and nitrogen gas contained in the anode off-gas from excess anode gas. The liquid-gas separation device 27 condenses steam contained in the anode off-gas into liquid water.

The anode gas having the impurities removed in the liquid-gas separation device 27 passes in the anode gas circulation passage 26 and is supplied to the anode gas supply passage 22 again via the jet pump 25. Further, a discharge hole for discharging the impurities to the purge passage 28 is formed in a lower part of the liquid-gas separation device 27.

The purge passage 28 is a passage for discharging the impurities separated by the liquid-gas separation device 27. One end of the purge passage 28 is connected to the discharge hole of the liquid-gas separation device 27 and the other end is connected to a part of the cathode gas discharge passage 13 downstream of the cathode pressure control valve 14.

The purge valve 29 is provided in the purge passage 28. The purge valve 29 is controlled to open and close by the controller 101. By this open/close control, the impurities such as nitrogen gas and liquid water are discharged to the cathode gas discharge passage 13.

The stack cooling device 30 is a device configured to adjust the fuel cell stack 1 to a temperature suitable for power generation, using the cooling water as refrigerant. The stack cooling device 30 includes a cooling water circulation passage 31, a cooling water pump 32, a radiator 33, a bypass passage 34, a hater 35, a thermostat 36, a branch passage 37, a stack inlet water temperature sensor 43 and a stack outlet water temperature sensor 44.

The cooling water circulation passage 31 is a passage for circulating the cooling water to the fuel cell stack 1. One end of the cooling water circulation passage 31 is connected to a cooling water inlet hole of the fuel cell stack 1 and the other end is connected to a cooling water outlet hole of the fuel cell stack 1.

The cooling water pump 32 is provided in the cooling water circulation passage 31. The cooling water pump 32 supplies the cooling water to the fuel cell stack 1 and the heat exchanger 23. The cooling water pump 32 is controlled by the controller 101.

The radiator 33 is provided on the side of a cooling water suction port of the cooling water pump 32 in the cooling water circulation passage 31. The radiator 33 cools the cooling water heated by the fuel cell stack 1.

The bypass passage 34 is a passage bypassing the radiator 33. One end of the bypass passage 34 is connected to the cooling water circulation passage 31 on a cooling water outlet side of the fuel cell stack 1, and the other end is connected to the thermostat 36.

The heater 35 is provided in the bypass passage 34. The heater 35 is energized to heat the cooling water when the fuel cell stack 1 is warmed up. In the present embodiment, the heater 35 generates heat by having power supplied from the fuel cell stack 1 by the DC/DC converter 3.

The thermostat 36 is provided in a part where the bypass passage 34 joins the cooling water circulation passage 31. The thermostat 36 is a three-way valve. The thermostat 36 automatically opens and closes in response to the temperature of the cooling water flowing inside the thermostat 36.

For example, the thermostat 36 is closed and supplies only the cooling water flowing by way of the bypass passage 34 to the fuel cell stack 1 when the temperature of the cooling water is lower than a predetermined valve opening temperature. In this way, the cooling water having a higher temperature than the cooling water flowing by way of the radiator 33 flows into the fuel cell stack 1.

On the other hand, the thermostat 36 starts gradually opening when the temperature of the cooling water becomes equal to or higher than the valve opening temperature. Then, the thermostat 36 mixes the cooling water flowing by way of the bypass passage 34 and the cooling water flowing by way of the radiator 33 and supplies the mixed cooling water to the fuel cell stack 1. In this way, the cooling water having a lower temperature than the cooling water flowing by way of the bypass passage 34 flows into the fuel cell stack 1.

The branch passage 37 is branched off from the cooling water circulation passage 31 between the cooling water pump 32 and the cooling water inlet hole of the fuel cell stack 1 and joins the cooling water circulation passage 31 at a position upstream of the bypass passage 34 via the heat exchanger 23.

The stack inlet water temperature sensor 43 is provided near the cooling water inlet hole of the fuel cell stack 1 in the cooling water circulation passage 31. The stack inlet water temperature sensor 43 detects a temperature of the cooling water flowing into the fuel cell stack 1 (hereinafter, referred to as a "stack inlet water temperature"). The stack inlet water temperature sensor 43 outputs a detection signal indicating the detected temperature to the controller 101.

The stack outlet water temperature sensor 44 is provided near the cooling water outlet hole of the fuel cell stack 1 in the cooling water circulation passage 31. The stack outlet water temperature sensor 44 detects a temperature of the cooling water discharged the fuel cell stack 1 (hereinafter, referred to as a "stack outlet water temperature"). The stack outlet water temperature sensor 44 outputs a detection signal indicating the detected temperature to the controller 101.

The stack resistance measuring device 45 measures an internal resistance (HFR: High Frequency Resistance) of the fuel cell stack 1 to estimate a degree of wetness of the electrolyte membranes constituting the fuel cells laminated in the fuel cell stack 1. The smaller the degree of wetness of the electrolyte membranes, i.e. the less moisture in the electrolyte membranes and the drier the electrolyte membranes, the larger the internal resistance. On the other hand, the larger the degree of wetness of the electrolyte membranes, i.e. the more moisture in the electrolyte membranes and the wetter the electrolyte membranes, the smaller the internal resistance.

For example, the stack resistance measuring device 45 supplies an AC current to a positive electrode terminal of the fuel cell stack 1 and detects an AC voltage between the positive electrode terminal and a negative electrode terminal by the AC current. Then, the stack resistance measuring device 45 calculates the internal resistance by dividing an amplitude of the AC voltage by an amplitude of the AC current, and outputs a value of the internal resistance, i.e. HFR to the controller 101.

The controller 101 is configured by a microcomputer including a central processing unit (CPU), a read-only memory (ROM), a random access memory (RAM) and an input/output interface (I/O interface).

To the controller 101 are input detection values output from the temperature sensor 41, the pressure sensor 42, the stack inlet water temperature sensor 43, the stack outlet water temperature sensor 44 and the stack resistance measuring device 45.

The controller 101 controls the compressor 12, the cathode pressure control valve 14, the bypass valve 16, the anode pressure control valve 24 and the purge valve 29 on the basis of input values, required power required from the fuel cell stack 1 and command values to the auxiliary machines. In this way, a power generation state of the fuel cell stack 1 is satisfactorily maintained.

The controller 101 executes a control of warming up the fuel cell stack 1 to a temperature suitable for power generation (hereinafter, referred to as a "warm-up operation") when the fuel cell system 100 is started.

In the warm-up operation, the controller 101 controls the DC/DC converter 3 such that power is supplied from the fuel cell stack 1 to the auxiliary machines such as the compressor 12, the cooling water pump 32 and the heater 35.

Since drive power necessary to drive the auxiliary machines is generated by the fuel cell stack 1, the fuel cell stack 1 itself further generates heat. In addition, the cooling water in the fuel cell stack 1 is heated to warm the fuel cell stack 1 by generated heat (output) of the heater 35.

At this time, since the amount of heat generation of the fuel cell stack 1 increases as the amount of power generation of the fuel cell stack 1 increases, the controller 101 sets a rotation speed of the compressor 12 and an output of the heater 35 to upper limit values of variable ranges. In this way, the warm-up of the fuel cell stack 1 is promoted.

When the fuel cell system as described above is started in a sub-zero temperature environment, the temperature of the anode gas supplied from the high-pressure tank 21 to the jet pump 25 could also reach −30° C.

In such a situation, steam in the anode off-gas becomes liquid water and that liquid water is frozen to generate ice in a part where the anode gas to be supplied to the jet pump 25 and the anode off-gas to be sucked by the jet pump 25 join. Thus, the amount of ice formed in the jet pump 25 increases until the temperature of the joined gas of the anode gas and the anode off-gas exceeds a freezing point.

For example, when the fuel cell system 100 is stopped before the joined gas reaches the freezing point, the formed ice remains in the jet pump 25. If the fuel cell system 100 is restarted in this state, ice is further generated on the ice formed in the jet pump 25. Thus, a part of a flow passage where the anode gas and the anode off-gas join may be closed and it may not be possible to supply the anode gas to the fuel cell stack 1 during the operation of the fuel cell system 100. Here, the closure of the flow passage by ice is referred to as freezing.

Accordingly, in the present embodiment, the controller 101 executes the warm-up operation of the fuel cell stack 1 when receiving a stop command for stopping the power generation of the fuel cell stack 1.

Figure 2:
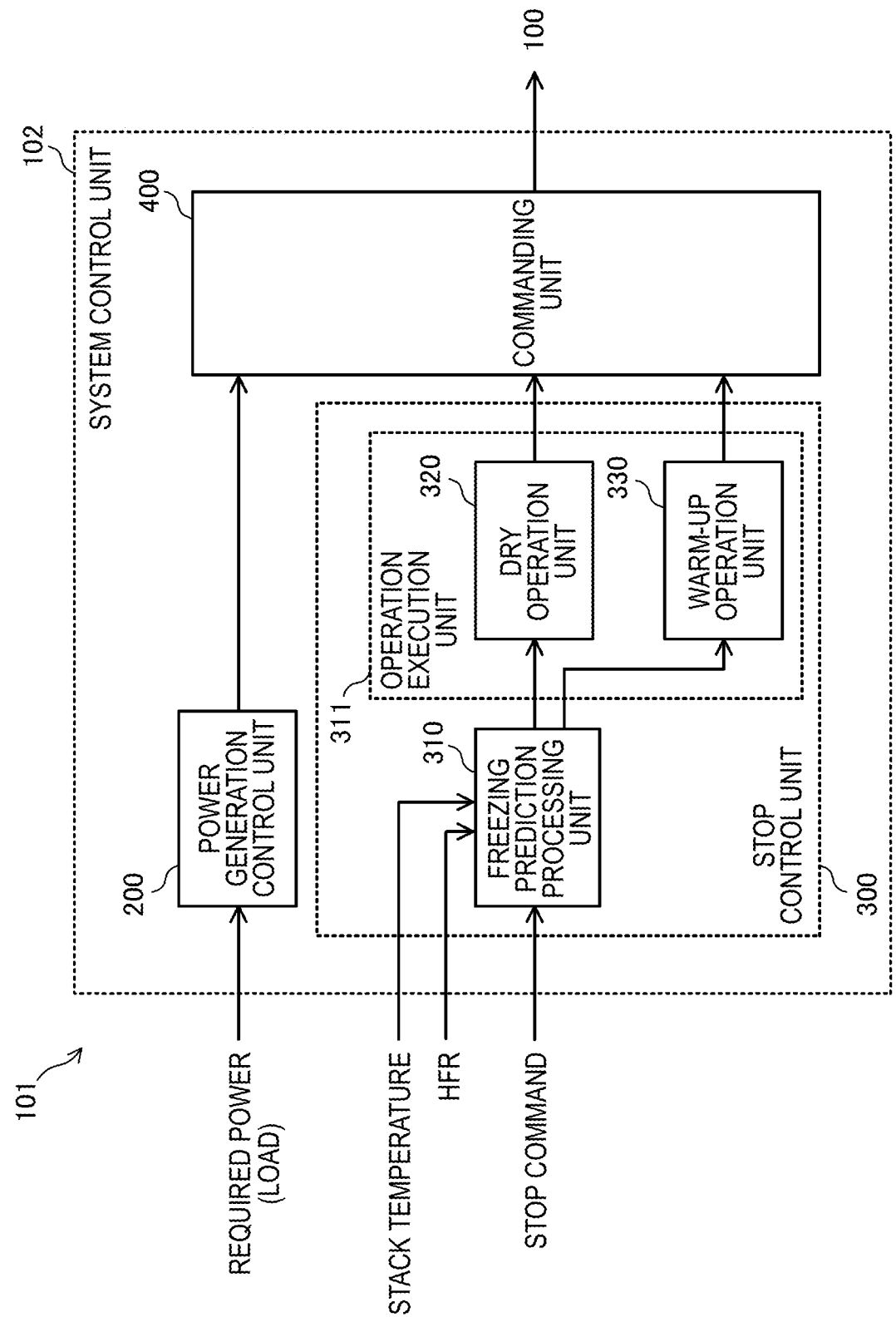
FIG. 2 is a block diagram showing a functional configuration of a controller configured to control the fuel cell system.

FIG. 2 is a diagram showing a basic configuration of the controller 101 in the first embodiment of the present invention.

The controller 101 includes a system control unit 102 configured to control the fuel cell system 100. The system control unit 102 includes a power generation control unit 200, a stop control unit 300 and a commanding unit 400.

The power generation control unit 200 controls the power generation state of the fuel cell stack 1 on the basis of required power. The required power is power required to the fuel cell stack 1 from the electric load 4 such as the electric motor.

For example, the power generation control unit 200 refers to a current-voltage (IV) characteristic of the fuel cell stack 1 and calculates a target value of a current to be taken out from the fuel cell stack 1 (hereinafter, referred to as a "target current") on the basis of the required power.

The power generation control unit 200 calculates a target pressure and a target flow rate of the cathode gas to be supplied to the fuel cell stack 1 on the basis of the target current thereof and calculates a target pressure of the anode gas to be supplied to the fuel cell stack 1 on the basis of the target current. Further, the power generation control unit 200 calculates a target flow rate of the cooling water to be supplied to the fuel cell stack 1 on the basis of the target current.

As just described, the power generation control unit 200 obtains the target pressure and the target flow rate of the cathode gas, the target pressure of the anode gas and the target flow rate of the cooling water on the basis of the required power of the electric load 4 and causes the fuel cell stack 1 to generate power using these parameters.

The stop control unit 300 controls the fuel cell system 100 to a stop state determined in advance on the basis of a stop command of the fuel cell system 100.

The stop control unit 300 includes a freezing prediction processing unit 310 and an operation execution unit 311.

The freezing prediction processing unit 310 constitutes a freezing prediction unit configured to predict the freezing of the jet pump 25 on the basis of the temperature of the fuel cell system 100.

The temperature of the fuel cell system 100 is a parameter for predicting the freezing of the jet pump 25. For example, an outside air temperature, the temperature of the fuel cell stack 1, the temperature of the anode off-gas to be circulated (sucked) to the jet pump 25 (circulating gas temperature), a supplied gas temperature or the like is used as such.

The freezing prediction processing unit 310 predicts the freezing of the jet pump 25 and judges whether or not the fuel cell stack 1 needs to be controlled to a state determined in advance when receiving a stop command of the fuel cell system 100.

The freezing prediction processing unit 310 judges whether or not the electrolyte membranes of the fuel cell stack 1 need to be controlled to a dry state determined in advance. In the present embodiment, the freezing prediction processing unit 310 judges, on the basis of a value of the internal resistance (HFR) output from the stack resistance measuring device 45, whether or not the electrolyte membranes need to be controlled to the dry state.

Further, the freezing prediction processing unit 310 judges, on the basis of the temperature of the fuel cell system 100, whether or not ice generated in the jet pump 25 needs to be removed.

In the present embodiment, the freezing prediction processing unit 310 judges, on the basis of the temperature of the fuel cell stack 1 (hereinafter, referred to as a "stack temperature"), whether or not ice needs to be removed. For example, the freezing prediction processing unit 310 predicts that the jet pump 25 will be frozen if the stack temperature is lower than a temperature at which ice in the jet pump 25 is removed.

In the present embodiment, the freezing prediction processing unit 310 estimates the amount of ice in the jet pump 25 and predicts the freezing of the jet pump 25 on the basis of that amount of ice.

The operation execution unit 311 executes the warm-up operation without stopping the fuel cell system 100 in the case of receiving the stop command of the fuel cell system 100 when the freezing of the jet pump 25 is predicted by the freezing prediction processing unit 310. The operation execution unit 311 includes a dry operation unit 320 and a warm-up operation unit 330.

The dry operation unit 320 executes a dry operation to control the fuel cell system 100 such that the electrolyte membranes reach a dry state determined in advance from a wet state if it is judged by the freezing prediction processing unit 310 that the electrolyte membranes need to be controlled to the dry state.

For example, the dry operation unit 320 increases the target flow rate of the cathode gas and reduces the target pressure of the cathode gas to increase a discharge amount of steam carried out from the fuel cell stack 1 by the cathode gas.

Further, the dry operation unit 320 warms up the fuel cell stack 1 if the stack temperature is lower than the freezing point. Since the temperature of the fuel cell stack 1 increases and the amount of saturated steam in the fuel cell stack 1 increases in this way, the discharge amount of steam carried out by the cathode gas can be increased.

By executing the dry operation in this way, a situation can be avoided where the fuel cell stack 1 is cooled by outside air and water retained in the electrolyte membranes is frozen to deteriorate the electrolyte membranes after the fuel cell system 100 is stopped.

On the other hand, the dry operation unit 320 stops the execution of the dry operation if it is judged by the freezing prediction processing unit 310 that the electrolyte membranes need not be controlled to the dry state. In this way, unnecessary execution of the dry operation can be prevented.

The warm-up operation unit 330 executes the warm-up operation for warming up the fuel cell stack 1 if it is judged that ice formed in the jet pump 25 needs to be removed, i.e. when the freezing of the jet pump 25 is predicted.

The warm-up operation unit 330 energizes the heater 35 to heat the cooling water in the fuel cell stack 1. In addition, the warm-up operation unit 330 causes the fuel cell stack 1 to generate power, for example, by increasing the rotation speed of the compressor 12 to increase the power consumption of the auxiliary machines. In this way, the temperature of the fuel cell stack 1 can be quickly increased.

Specifically, the warm-up operation unit 330 calculates the target current on the basis of auxiliary machine power consumption for warming up the fuel cell stack 1, and calculates the target pressure and the target flow rate of the cathode gas and the target pressure of the anode gas on the basis of that target current.

By executing the warm-up operation in this way, the stack temperature increases and, associated with this, the temperature of the anode off-gas to be sucked into the jet pump 25 increases, wherefore ice in the jet pump 25 can be melted.

On the other hand, the warm-up operation unit 330 stops the execution of the warm-up operation if it is judged by the freezing prediction processing unit 310 that ice in the jet pump 25 needs not be removed. Specifically, the freezing prediction processing unit 310 limits the execution of the warm-up operation when predicting that the jet pump 25 will not be frozen. In this way, unnecessary execution of the warm-up operation can be prevented.

The commanding unit 400 outputs a command signal to each control component of the fuel cell system 100 on the basis of the parameter output from the power generation control unit 200 or the stop control unit 300.

For example, the commanding unit 400 calculates a target rotation speed of the compressor 12 and a target opening degree of the cathode pressure control valve 14 on the basis of the target pressure and the target flow rate of the cathode gas. Further, the commanding unit 400 calculates a target opening degree of the bypass valve 16 such that the flow rate of the cathode gas to be supplied to the fuel cell stack 1 reaches the target flow rate. Then, the commanding unit 400 outputs command signals indicating calculation results to the compressor 12, the cathode pressure control valve 14 and the bypass valve 16.

Further, the commanding unit 400 calculates an opening degree of the anode pressure control valve 24 on the basis of the target pressure of the anode gas and outputs a command signal designating that target opening degree to the anode pressure control valve 24. Furthermore, the commanding unit 400 calculates power to be supplied to the heater 35 on the basis of the target output of the heater 35 and controls the DC/DC converter 3 according to that target power.

According to the first embodiment of the present invention, the fuel cell system 100 includes the jet pump 25 for circulating the anode off-gas to the fuel cell stack 1. The controller 101 includes the power generation control unit 200 configured to control the power generation state of the fuel cell stack 1 on the basis of the required power and the freezing prediction processing unit 310 configured to predict the freezing of the jet pump 25 on the basis of the temperature of the fuel cell system 100.

The operation execution unit 311 warms up the fuel cell stack 1 during or after the stop of the fuel cell system 100 when the freezing is predicted by the freezing prediction processing unit 310. Examples of a parameter for predicting the freezing includes the temperature of the fuel cell stack 1 correlated with the temperature of the anode off-gas, an estimated value of the amount of ice in the jet pump 25 and the HFR of the fuel cell stack 1.

By warming up the fuel cell stack 1 on the basis of the freezing prediction of the jet pump 25 in this way after the stop command is received, ice formed in a flow passage in which the anode gas is circulated can be reliably removed.

For example, ice is formed in the jet pump 25 during the warm-up of the fuel cell stack 1 in such an environment where the fuel cell system 100 is started at a sub-zero temperature of −30° C., and the fuel cell system 100 could be stopped in this state. If the fuel cell system 100 is restarted in such a situation, ice newly generated during the warm-up is further accumulated on the ice remaining in the jet pump 25, the jet pump 25 is frozen and it may not be possible to supply the anode gas to the fuel cell stack 1.

In contrast, since the temperature of the anode off-gas to be sucked into the jet pump 25 is increased by warming up the fuel cell stack 1 after the stop command is received in the present embodiment, the temperature of the joined gas of the anode gas and the anode off-gas increases to the freezing point. Since the ice in the jet pump 25 is melted in this way, the closure of the flow passage, in which the anode gas is circulated, due to the remaining ice can be prevented when the fuel cell system 100 is restarted below a freezing point.

It should be noted that components provided in the flow passage in which the anode gas is circulated include the pressure sensor 42 and the gas-liquid separation device 27 besides the jet pump 25. Further, in a fuel cell system in which a circulation pump is provided in an anode gas circulation passage 26, the circulation pump corresponds to such a component. Since such components are also possibly frozen during the warm-up operation, ice can be removed from these components by executing the warm-up operation during a stop process.

Further, although the fuel cell system 100 of the present embodiment is for circulating the anode off-gas to the fuel cell stack 1, effects and functions similar to those of the present embodiment can be obtained even if cathode off-gas is circulated to the fuel cell stack 1.

As described above, in the fuel cell system for circulating at least one discharged gas, out of the anode off-gas and the cathode off-gas, to the fuel cell stack 1, the warm-up operation is executed according to a frozen state of the flow passage in which the discharged gas is circulated when the stop command is issued, whereby the freezing and closure of the flow passage during the next start can be prevented.

Second Embodiment

Figure 3:
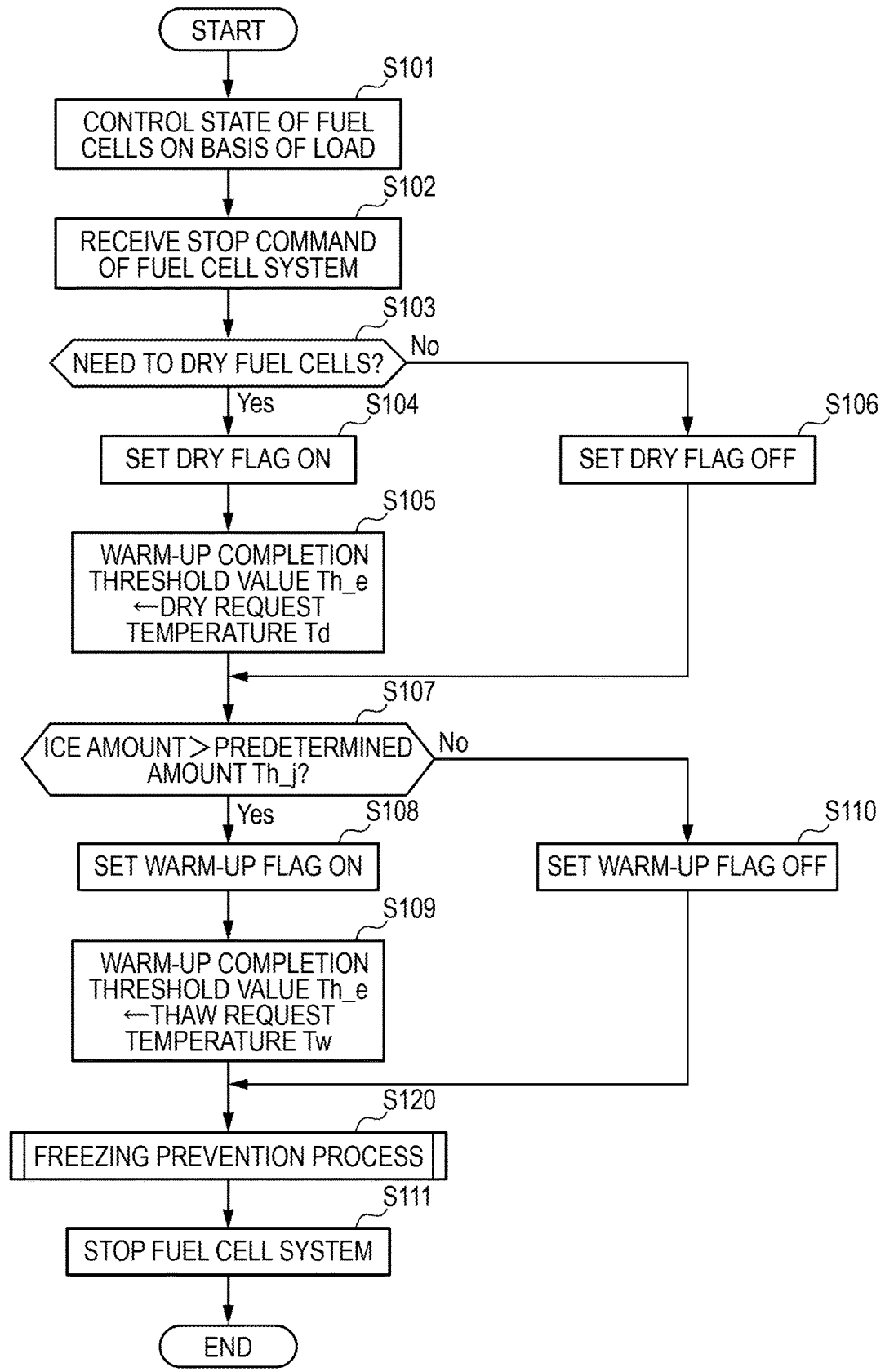
FIG. 3 is a flow chart showing an example of a stop method for fuel cell system.

FIG. 3 is a flow chart showing a stop method for fuel cell system in a second embodiment of the present invention.

A fuel cell system of this embodiment has the same basic configuration as the fuel cell system 100 shown in FIG. 1. The same components as those of the fuel cell system 100 are denoted by the same reference signs and not described in detail below.

In Step S101, a power generation control unit 200 of a controller 101 controls a power generation state of a fuel cell stack 1 on the basis of required power of electric load 4.

In Step S102, a freezing prediction processing unit 310 of the controller 101 judges whether or not a stop command for stopping the power generation of the fuel cell stack 1 has been received. The stop command is output to a stop control unit 300, for example, when an operation switch provided in the fuel cell system 100 is set from a start-up state to a stop state.

In Step S103, the freezing prediction processing unit 310 judges whether or not electrolyte membranes of fuel cells need to be dried if the stop command of the fuel cell system 100 has been received.

In Step S104, the freezing prediction processing unit 310 sets a dry flag on if it is judged that the electrolyte membranes need to be dried. In this case, an operation execution unit 311 executes a dry operation. In the dry operation, the operation execution unit 311 increases a flow rate of cathode gas to be supplied to the fuel cell stack 1 or reduces a pressure of the cathode gas so that the electrolyte membranes are dried, and warms up the fuel cell stack 1 when the temperature of the fuel cell stack 1 is low.

In Step S105, the freezing prediction processing unit 310 sets a dry request temperature Td at a warm-up completion threshold value Th_e if the dry flag is set on. The dry request temperature Td is set at a temperature at which steam contained in the cathode gas increases, e.g. set at 40° C.

In Step S106, the freezing prediction processing unit 310 sets the dry flag off if it is judged that the electrolyte membranes need not be dried. In this case, the stop control unit 300 does not execute the dry operation.

In Step S107, the freezing prediction processing unit 310 predicts, on the basis of the amount of ice formed in the jet pump 25, whether or not a jet pump 25 will be frozen when the fuel cell system 100 is restarted.

In the present embodiment, the freezing prediction processing unit 310 judges whether or not the amount of ice in the jet pump 25 is larger than a freezing prevention threshold value Th_j.

The freezing prevention threshold value Th_j is a threshold value for predicting the freezing of the jet pump 25 and determined not to close the jet pump 25 in consideration of the amount of ice to be newly generated in the jet pump 25 when the fuel cell system 100 is restarted. The freezing prevention threshold value Th_j is set at a value of, e.g. about 50% with respect to the amount of ice for closing the jet pump 25.

In Step S108, the freezing prediction processing unit 310 sets a warm-up flag on if the amount of ice in the jet pump 25 is larger than the freezing prevention threshold value Th_j. In this case, the operation execution unit 311 executes the warm-up operation for warming up the fuel cell stack 1.

In Step S109, the freezing prediction processing unit 310 sets a thaw request temperature Tw at the warm-up completion threshold value Th_e if the warm-up flat has been set on. The thaw request temperature Tw is set at a temperature at which the ice of the jet pump 25 is removed and, in the present embodiment, set at 60° C.

In Step S110, the freezing prediction processing unit 310 sets the warm-up flag off if the amount of ice in the jet pump 25 is not larger than the freezing prevention threshold value Th_j. In this case, the freezing prediction processing unit 310 predicts that the jet pump 25 will not be frozen during the warm-up operation during the next start and does not execute the warm-up operation.

In Step S120, the operation execution unit 311 performs a freezing prevention process of the fuel cell system 100 according to set states of the dry flag and the warm-up flag.

In Step S111, the stop control unit 300 sets a breaker (not shown) connected between the fuel cell stack 1 and the electric load 4 to a shut-off state and stops the fuel cell system 100 after the freezing prevention process is completed.

Figure 4:
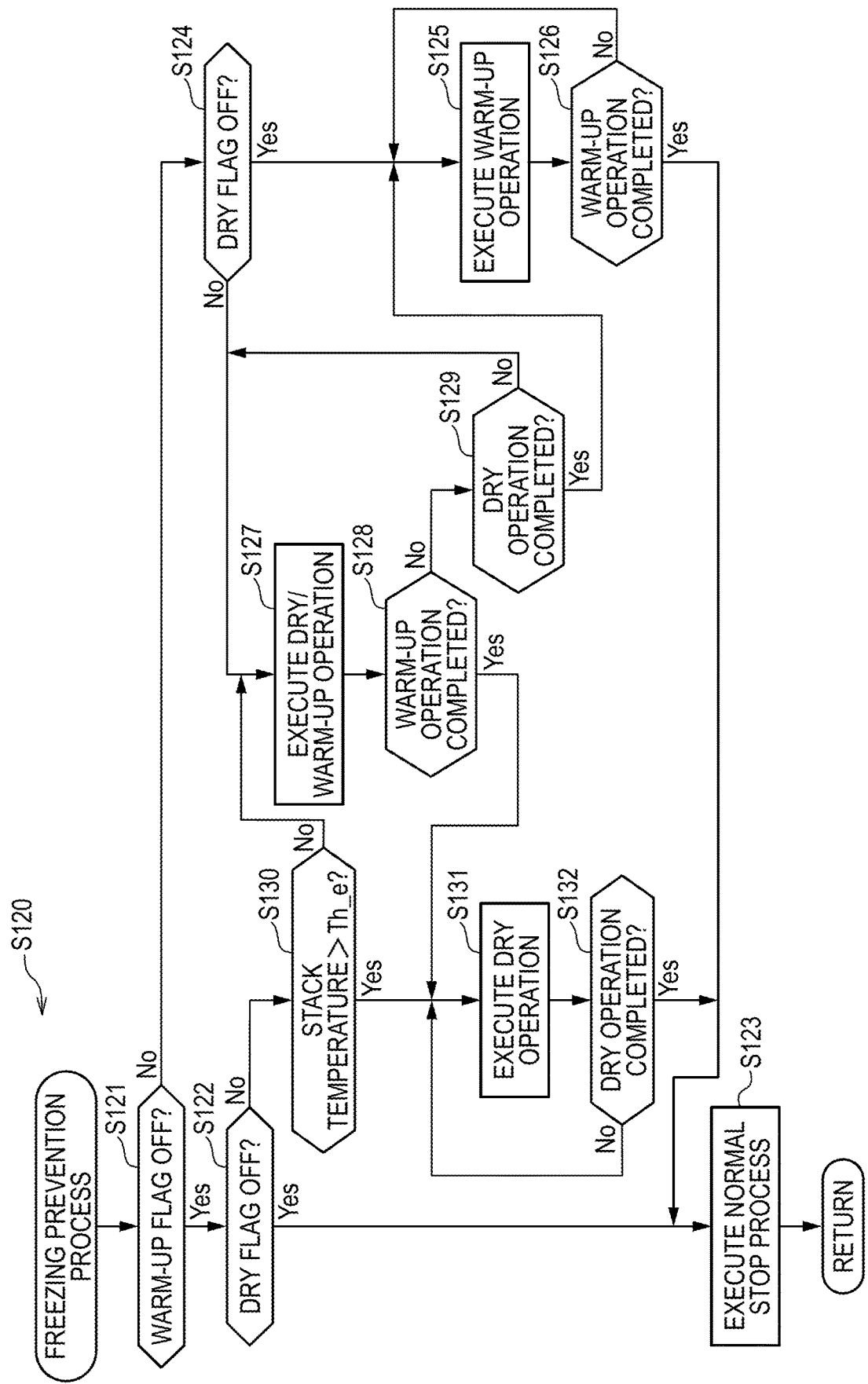
FIG. 4 is a flow chart showing a freezing prevention process.

FIG. 4 is a flow chart showing an example of a process procedure of the freezing prevention process performed in Step S120 of FIG. 3.

In Step S121, the operation execution unit 311 judges whether or not the warm-up flag has been set off.

In Step S122, the operation execution unit 311 judges whether or not the dry flag has been set off if the warm-up flag has been set off. The operation execution unit 311 proceeds to a processing of Step S123 without executing either the warm-up operation or the dry operation if the warm-up flag and the dry flag have been both set off.

In Step S123, the operation execution unit 311 performs a stop process of the fuel cell system 100. For example, the operation execution unit 311 reduces a voltage of the fuel cell stack 1 to a predetermined value to suppress the deterioration of the electrolyte membranes due to high potential and, thereafter, performs a process of stopping the supply of the anode gas and the cathode gas to the fuel cell stack 1.

In Step S124, the operation execution unit 311 judges whether or not the dry flag has been set off if the warm-up flag has been set on in Step S121.

In Step S125, the operation execution unit 311 executes the warm-up operation if the warm-up flag has been set on and the dry flag has been set off.

In Step S126, the operation execution unit 311 judges whether or not the warm-up operation has been completed. For example, the operation execution unit 311 judges that the warm-up operation has been completed and proceeds to the processing of Step S123 if a stack temperature has become higher than the warm-up completion threshold value Th_e. It should be noted that the warm-up completion threshold value Th_e is set at the temperature Tw at which the ice of the jet pump 25 melts.

The temperature of the cooling water circulating through the fuel cell stack 1 is used as the stack temperature. In the present embodiment, an average value of a stack inlet water temperature and a stack outlet water temperature of the cooling water is used as the stack temperature. It should be noted that the stack inlet water temperature or the stack outlet water temperature may be used as the stack temperature. Alternatively, a temperature sensor may be directly provided for the fuel cell stack 1 and a detection signal output from the temperature sensor may be used.

In Step S127, the operation execution unit 311 executes both the warm-up operation and the dry operation if it is judged in Step S124 that the dry flag has been set on, i.e. if the warm-up flag and the dry flag have been both set on.

In Step S128, the operation execution unit 311 judges whether or not the warm-up operation has been completed. For example, the operation execution unit 311 judges that the warm-up operation has not been completed and proceeds to a processing of Step S129 if the stack temperature is lower than the warm-up completion threshold value Th_e.

The warm-up completion threshold value Th_e is set at the thaw request temperature Tw if the warm-up flag has been set on while being set at the dry request temperature Td lower than the thaw request temperature Tw if the dry flag is set on with the warm-up flag set off.

In Step S129, the freezing prediction processing unit 310 judges whether or not the dry operation has been completed. In the present embodiment, when the freezing prediction processing unit 310 judges that the dry operation has been completed, the operation execution unit 311 executes only the warm-up operation in Step S125 if HFR measured by a stack resistance measuring device 45 is not smaller than a reference value determined in advance, i.e. if the electrolyte membranes are drier than in a predetermined dry state.

On the other hand, the operation execution unit 311 returns to a processing of Step S127 and executes both the warm-up operation and the dry operation if the HFR is smaller than the reference value determined in advance, i.e. if the electrolyte membranes are wetter than in the predetermined dry state.

In Step S130, the operation execution unit 311 judges whether or not the stack temperature is lower than the dry request temperature Td set at the warm-up completion threshold value Th_e if it is judged in Step S122 that the dry flag has been set on.

An advance is made to the processing of Step S127 if the stack temperature is lower than the dry request temperature Td, whereas an advance is made to a processing of Step 131 if the stack temperature is not lower than the dry request temperature Td.

In Step S131, the operation execution unit 311 executes only the dry operation if it is judged in Step S128 that the warm-up operation has been completed or if it is judged in Step S130 that the stack temperature is not lower than the dry request temperature Td.

In Step S132, the freezing prediction processing unit 310 judges whether or not the dry operation has been completed. For example, when the freezing prediction processing unit 310 judges that the dry operation has not been completed, the operation execution unit 311 returns to the processing of Step S131 to continue the dry operation if the HFR is lower than a reference value, i.e. if the electrolyte membranes are wetter than in the predetermined dry state.

The operation execution unit 311 performs the stop process in Step S123, finishes the freezing prevention process and returns to the stop method for the fuel cell system 100 shown in FIG. 3 if it is judged that the dry operation has been completed.

Next, a technique for estimating the amount of ice to be generated in the jet pump 25 is described.

Figure 5:
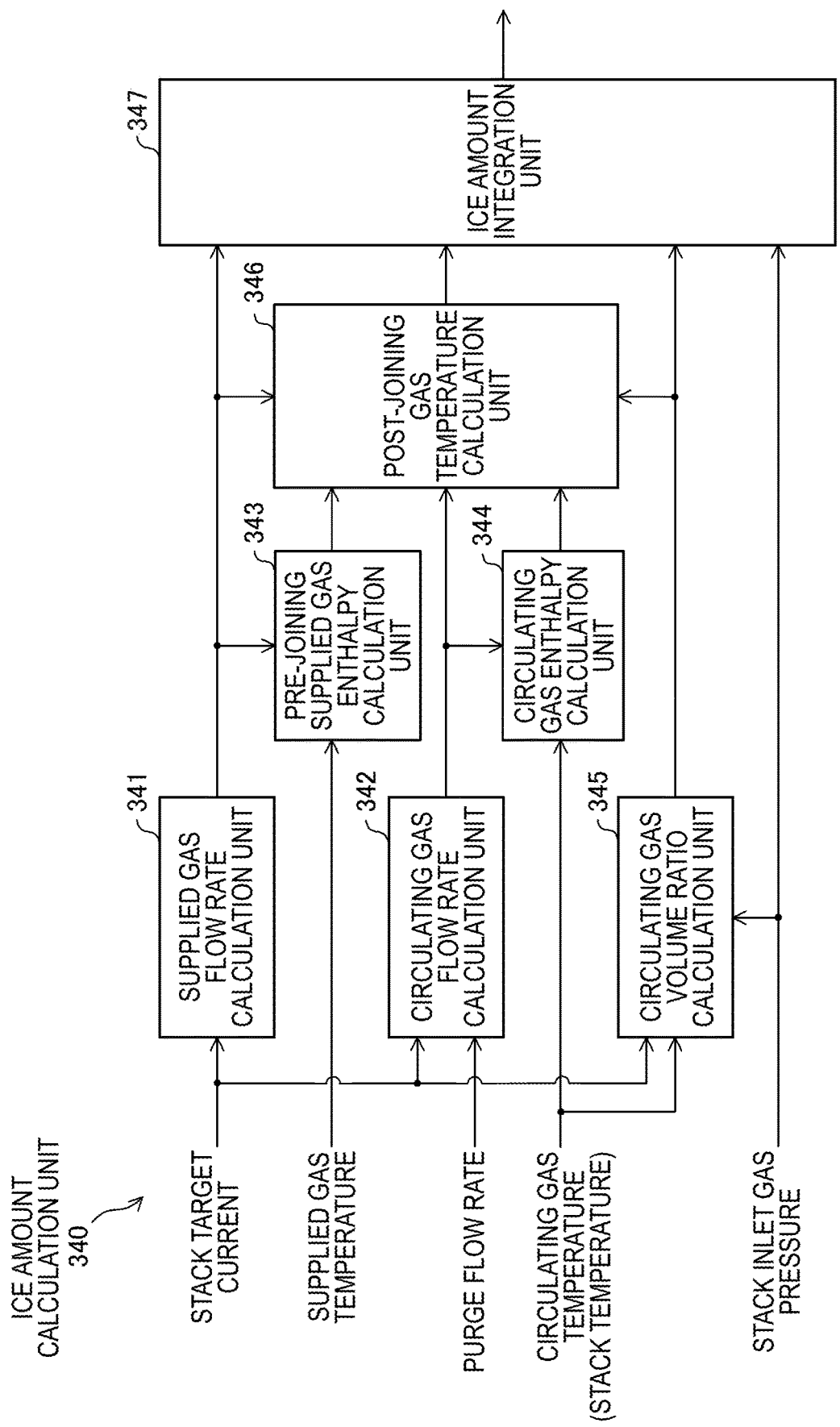
FIG. 5 is a block diagram showing a configuration for calculating the amount of ice.

FIG. 5 is a block diagram showing a part of the configuration of the freezing prediction processing unit 310 in the present embodiment. The freezing prediction processing unit 310 is provided with an ice amount calculation unit 340 configured to calculate the amount of ice in the jet pump 25.

The ice amount calculation unit 340 includes a supplied gas flow rate calculation unit 341, a circulating gas flow rate calculation unit 342, a pre joining supplied gas enthalpy calculation unit 343 and a circulating gas enthalpy calculation unit 344. Further, the ice amount calculation unit 340 includes a circulating gas volume ratio calculation unit 345, a post-joining gas temperature calculation unit 346 and an ice amount integration unit 347.

The supplied gas flow rate calculation unit 341 calculates a flow rate of the anode gas to be supplied to the fuel cell stack 1 (hereinafter, referred to as a "supplied gas flow rate") on the basis of a target current of the fuel cell stack 1.

The target current is calculated on the basis of power required from load such as an electric motor and auxiliary machines. For example, the target current increases as a depressed amount of an accelerator pedal increases since power required from the electric motor increases.

The circulating gas flow rate calculation unit 342 calculates a flow rate of the anode off-gas circulated from the fuel cell stack 1 to the jet pump 25 (hereinafter, referred to as a "circulating gas flow rate") on the basis of the target current of the fuel cell stack 1 and a purge flow rate. It should be noted that the purge flow rate is calculated on the basis of the target current of the fuel cell stack 1 and an opening degree of a purge valve 29.

The pre-joining supplied gas enthalpy calculation unit 343 calculates an enthalpy of pre-joining supplied gas on the basis of a flow rate of the anode gas supplied from a high-pressure tank 21 to the jet pump 25 (hereinafter, referred to as a "pre joining supplied gas flow rate") and a supplied gas temperature. The pre joining supplied gas flow rate is a value obtained by subtracting a hydrogen gas flow rate in the circulating gas from the supplied gas flow rate. The supplied gas temperature is the temperature of the anode gas to be supplied to the jet pump 25 and calculated on the basis of a detection signal output from the temperature sensor 41.

The circulating gas enthalpy calculation unit 344 calculates an enthalpy of the anode off-gas (circulating gas) to be circulated to the jet pump 25 on the basis of the circulating gas flow rate and the stack temperature. Here, the stack temperature is used as the temperature of the anode off-gas to be sucked into the jet pump 25 (stack outlet gas temperature).

The circulating gas volume ratio calculation unit 345 calculates a volume ratio of hydrogen gas, nitrogen gas and stream in the circulating gas.

Specifically, the circulating gas volume ratio calculation unit 345 calculates a volume ratio of hydrogen gas in the circulating gas from a map determined in advance on the basis of the target current of the fuel cell stack 1. Further, the circulating gas volume ratio calculation unit 345 calculates a stack outlet gas pressure by subtracting a pressure loss in the fuel cell stack 1 from a stack inlet gas pressure, and calculates a steam volume ratio by dividing the stack outlet gas pressure by a saturated stream pressure obtained from the stack temperature. Then, the circulating gas volume ratio calculation unit 345 calculates a nitrogen gas volume ratio from the volume ratios of the hydrogen gas and the steam in the circulating gas.

The post-joining gas temperature calculation unit 346 calculates the temperature of post-joining gas obtained by joining the pre joining supplied gas and the circulating gas in the jet pump 25.

Specifically, the post-joining gas temperature calculation unit 346 calculates a total enthalpy of the pre-joining gas by adding the enthalpies of the pre joining supplied gas and the circulating gas.

Subsequently, the post-joining gas temperature calculation unit 346 integrates a heat capacity obtained by multiplying specific heat of the hydrogen gas by the supplied gas flow rate, a heat capacity obtained by multiplying a nitrogen gas flow rate in the circulating gas by specific heat of the nitrogen gas and a heat capacity obtained by multiplying a steam flow rate in the circulating gas by steam specific heat on the basis of the volume ratio of the circulating gas. The post-joining gas temperature calculation unit 346 calculates the gas temperature after joining by dividing the total enthalpy before joining by the integrated heat capacity.

The ice amount integration unit 347 integrates an ice amount V in the jet pump 25 as in the following equation, using a pre joining supplied gas flow rate $Q_0$, a steam flow rate $Q_{0\_H2O}$ in the pre joining supplied gas, a circulating gas flow rate $Q_1$, a steam flow rate $Q_{1\_H2O}$ in the circulating gas, a saturated steam pressure $P_{2\_sat}$ after joining and a pressure $P_2$ after joining.

[Equation 1]

$$V = \left| (Q_{1\_H2O} + Q_{0\_H2O}) - \frac{P_{2\_sat}}{P_2 - P_{2\_sat}} \cdot (Q_1 - Q_{1\_H2O} + Q_0 - Q_{0\_H2O}) \right| \quad (3)$$

It should be noted that the steam flow rate $Q_{1\_H2O}$ in the circulating gas is calculated on the basis of the circulating gas flow rate $Q_1$ and the steam volume ratio calculated by the circulating gas volume ratio calculation unit 345. The saturated steam pressure $P_{2\_sat}$ after joining is calculated on the basis of the post-joining gas temperature calculated by the post-joining gas temperature calculation unit 346. The pressure $P_2$ after joining is the stack inlet pressure detected by the pressure sensor 42. Further, in the present embodiment, the steam flow rate $Q_{0\_H2O}$ in the supplied gas is set at zero since it is negligibly small.

In this way, the ice amount calculation unit 340 calculates the amount of ice in the jet pump 25 using parameters such as the target current, the supplied gas temperature, the stack temperature and the stack inlet pressure as parameters for predicting the freezing.

Next, a detailed configuration of a system control unit 102 in the present embodiment is described with reference to each of FIGS. 6 to 11. The system control unit 102 includes a stack flow rate control unit 500, a compressor flow rate control unit 600, a stack pressure control unit 700, a heater output control unit 800 and a stack power control unit 900.

Figure 6:
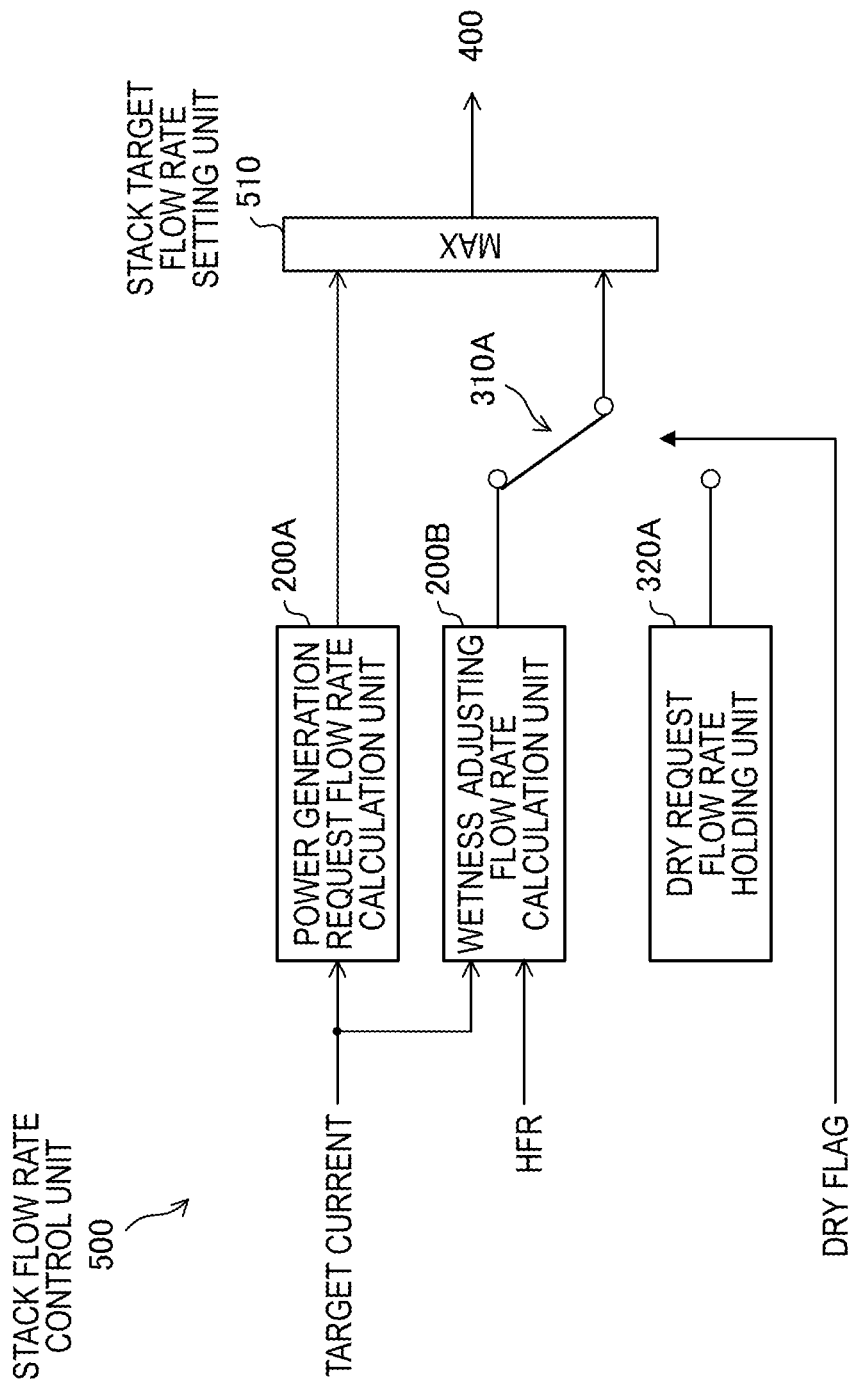
FIG. 6 is a block diagram showing a configuration for controlling a pressure of cathode gas to be supplied to a fuel cell stack.

FIG. 6 is a block diagram showing an example of a detailed configuration of the stack flow rate control unit 500.

The stack flow rate control unit 500 controls a flow rate of the cathode gas to be supplied to the fuel cell stack 1 (hereinafter, referred to as a "stack flow rate").

The stack flow rate control unit 500 includes a power generation request flow rate calculation unit 200A, a wetness adjusting flow rate calculation unit 200B, a switcher 310A, a dry request flow rate holding unit 320A and a stack target flow rate setting unit 510.

The power generation request flow rate calculation unit 200A calculates a stack flow rate necessary for the power generation of the fuel cell stack 1 (hereinafter, referred to as a "power generation request flow rate") on the basis of the target current of the fuel cell stack 1. It should be noted that the power generation request flow rate calculation unit 200A constitutes the power generation control unit 200 shown in FIG. 2.

The power generation request flow rate calculation unit 200A increases the power generation request flow rate to increase the amount of power generation of the fuel cell stack 1 as the target current of the fuel cell stack 1 increases.

For example, a power generation request map indicating a relationship between the target current of the fuel cell stack 1 and the power generation request flow rate of the cathode gas is stored in advance in the power generation request flow rate calculation unit 200A. When obtaining the target current, the power generation request flow rate calculation unit 200A refers to the power generation request map and outputs the power generation request flow rate associated with that target current to the stack target flow rate setting unit 510.

The wetness adjusting flow rate calculation unit 200B calculates such a stack flow rate that a wet/dry state of the electrolyte membranes reaches a targeted state (hereinafter, referred to as a "wetness adjusting flow rate") on the basis of the HFR (internal resistance) and the target current of the fuel cell stack 1. It should be noted that the wetness adjusting flow rate calculation unit 200B constitutes the power generation control unit 200 shown in FIG. 2.

The wetness adjusting flow rate calculation unit 200B calculates the wetness adjusting flow rate according to a difference (deviation) between the HFR and a reference value determined in advance. For example, the wetness adjusting flow rate calculation unit 200B increases the wetness adjusting flow rate to increase the flow rate of steam carried out by the cathode gas if the HFR is smaller than the reference value, i.e. if the electrolyte membranes are wetter than in the targeted state.

The reference value of the HFR is set to reduce a water retention capacity of the electrolyte membranes within such a range that the electrolyte membranes are not deteriorated. Specifically, the reference value is set such that the electrolyte membranes are drier than in a wet/dry state suitable for power generation. This can prevent water retained in the electrolyte membranes from being frozen to freeze the electrolyte membranes after the stop of the fuel cell system 100.

Further, the wetness adjusting flow rate calculation unit 200B increases the wetness adjusting flow rate as the target current of the fuel cell stack 1 increases since the amount of steam generated by power generation increases and the electrolyte membranes are likely to become wetter. On the other hand, the wetness adjusting flow rate calculation unit 200B reduces the wetness adjusting flow rate as the target current decreases since the amount of generated steam is reduced.

For example, a wetness adjustment map indicating a relationship between the HFR and the wetness adjusting flow rate is stored for each target current determined in advance in the wetness adjusting flow rate calculation unit 200B. When receiving the target current and the HFR, the wetness adjusting flow rate calculation unit 200B refers to the wetness adjustment map specified by that target current and calculates the wetness adjusting flow rate associated with that HFR. The wetness adjusting flow rate calculation unit 200B outputs that calculated wetness adjusting flow rate to the stack target flow rate setting unit 510.

The dry request flow rate holding unit 320A holds a stack flow rate determined to dry the electrolyte membranes (hereinafter, referred to as a "dry request flow rate") after receiving a stop command. Specifically, the dry request flow rate holding unit 320A outputs the dry request flow rate to execute the dry operation. It should be noted that the dry request flow rate holding unit 320A constituting the dry operation unit 320 shown in FIG. 2.

The dry request flow rate is set at a value larger than the wetness adjusting flow rate to increase a discharge amount of steam carried out by the cathode gas. It should be noted that the dry request flow rate is not limited to a fixed value and may be changed, for example, according to a temperature state of the fuel cell stack 1.

The switcher 310A switches a value to be output to the stack target flow rate setting unit 510 to the wetness adjusting flow rate or the dry request flow rate according to a set state of the dry flag. It should be noted that the switcher 310A constitutes the freezing prediction processing unit 310 shown in FIG. 2.

The switcher 310A outputs the dry request flow rate to the stack target flow rate setting unit 510 if the dry flag has been set on, i.e. if the dry operation is executed during the stop of the fuel cell system 100. On the other hand, the switcher 310A outputs the wetness adjusting flow rate to the stack target flow rate setting unit 510 if the dry flag has been set off, i.e. if the dry operation is not executed.

The stack target flow rate setting unit 510 outputs the larger one of the value output from the power generation request flow rate calculation unit 200A and the value output from the switcher 310A as a stack target flow rate to the commanding unit 400.

As just described, a switch is made from the wetness adjusting flow rate to the dry request flow rate to increase the flow rate of the cathode gas if the dry flag has been set on during the stop of the fuel cell system 100. Since the flow rate of steam carried out from the fuel cell stack 1 by the cathode gas increases in this way, the electrolyte membranes of the fuel cell stack 1 can be quickly dried.

Figure 7:
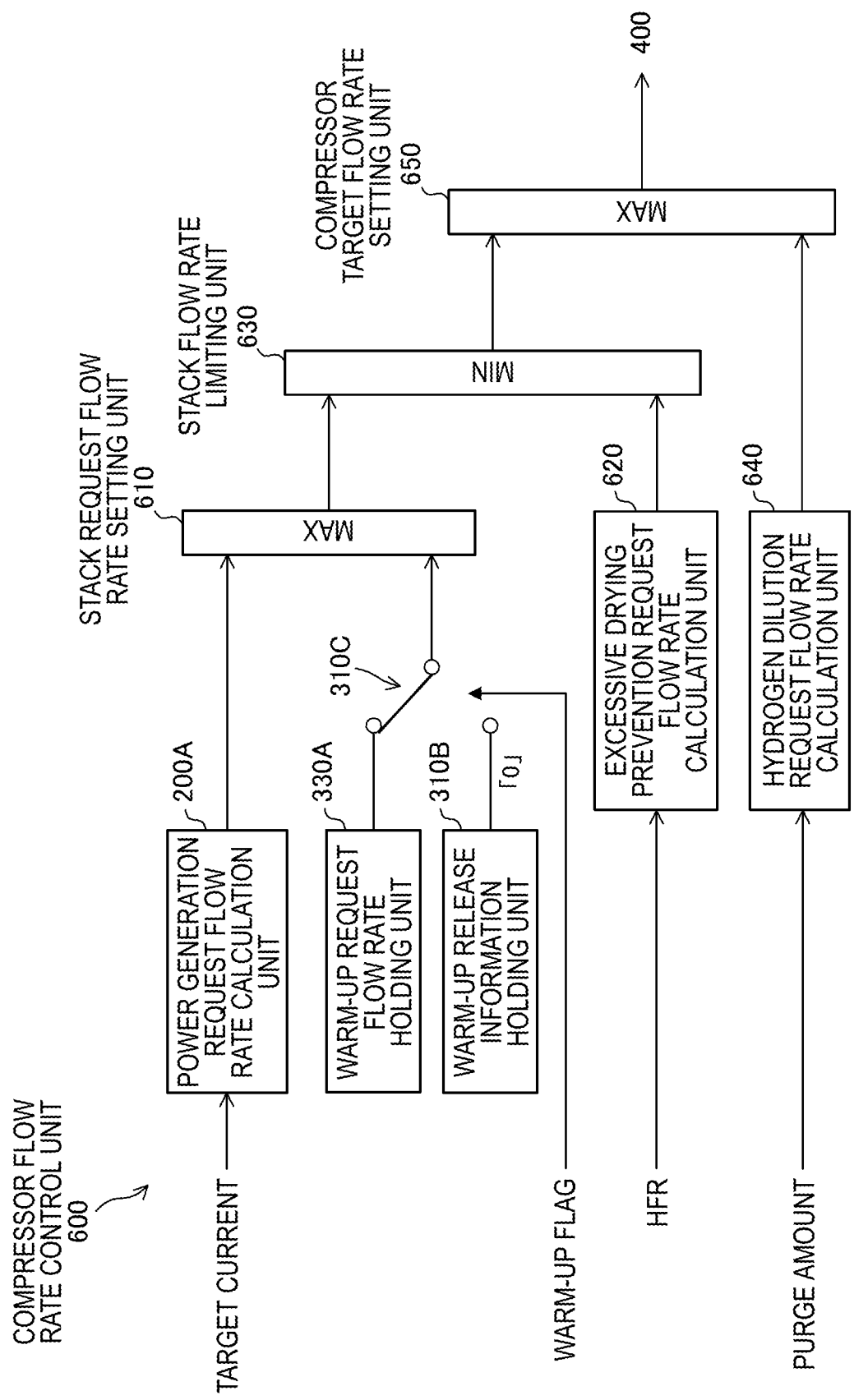
FIG. 7 is a block diagram showing a configuration for controlling a flow rate of the cathode gas discharged from a compressor.

FIG. 7 is a block diagram showing an example of a detailed configuration of the compressor flow rate control unit 600.

The compressor flow rate control unit 600 controls a flow rate of the cathode gas discharged from the compressor 12 (hereinafter, referred to as a "compressor flow rate").

The compressor flow rate control unit 600 includes a power generation request flow rate calculation unit 200A, a warm-up release information holding unit 310B, a switcher 310C, a warm-up request flow rate holding unit 330A and a stack request flow rate setting unit 610. Further, the compressor flow rate control unit 600 includes an excessive drying prevention request flow rate calculation unit 620, a stack flow rate limiting unit 630, a hydrogen dilution request flow rate calculation unit 640 and a compressor target flow rate setting unit 650.

The power generation request flow rate calculation unit 200A is not described here since having the same configuration as the power generation request flow rate calculation unit 200A shown in FIG. 6.

The warm-up request flow rate holding unit 330A holds a compressor flow rate determined to warm up the fuel cell stack 1 (hereinafter, referred to as a "warm-up request flow rate") after receiving a stop command of the fuel cell system 100. Specifically, the warm-up request flow rate holding unit 330A outputs the warm-up request flow rate to execute the warm-up operation. It should be noted that the warm-up request flow rate holding unit 330A constitutes the warm-up operation unit 330 shown in FIG. 2.

The warm-up request flow rate is set at a value larger than the power generation request flow rate to increase power consumed by the compressor 12. For example, the warm-up request flow rate is set at an upper limit value of the rotation speed of the compressor 12, i.e. a maximum value of the flow rate of the cathode gas dischargeable by the compressor 12. It should be noted that the warm-up request flow rate is not limited to a fixed value and may be changed, for example, according to the temperature state of the fuel cell stack 1.

The warm-up release information holding unit 310B holds zero as a value for releasing the warm-up operation.

The switcher 310C switches a value to be output to the stack request flow rate setting unit 610 to the warm-up request flow rate or zero according to the set state of the warm-up flag. It should be noted that the switcher 310C constitutes the freezing prediction processing unit 310 shown in FIG. 2.

The switcher 310C outputs the warm-up request flow rate to the stack request flow rate setting unit 610 if the warm-up flag has been set on, i.e. if the warm-up operation is executed during the stop of the fuel cell system 100. On the other hand, the switcher 310C outputs zero as the value for releasing the warm-up operation to the stack request flow rate setting unit 610 if the warm-up flag has been set off, i.e. if the warm-up operation is not executed.

The stack request flow rate setting unit 610 outputs the larger one of the value output from the power generation request flow rate calculation unit 220A and the value output from the switcher 310C as the stack request flow rate.

For example, the stack request flow rate setting unit 610 outputs the warm-up request flow rate larger than the power generation request flow rate to the stack flow rate limiting unit 630 if the warm-up flag is set on when the fuel cell system 100 is stopped.

The excessive drying prevention request flow rate calculation unit 620 calculates a compressor flow rate for preventing the electrolyte membranes from becoming excessively dry (hereinafter, referred to as an "excessive drying prevention flow rate") on the basis of the HFR measured by the stack resistance measuring device 45.

The excessive drying prevention request flow rate calculation unit 620 reduces the excessive drying prevention request flow rate to reduce the flow rate of steam carried out from the fuel cell stack 1 by the cathode gas as the HFR increases.

An excessive drying prevention map indicating a relationship between the HFR and the excessive drying prevention request flow rate is stored in advance in the excessive drying prevention request flow rate calculation unit 620. The excessive drying prevention map is generated in advance on the basis of experimental data and the like. The excessive drying prevention request flow rate calculation unit 620 outputs a calculation result to the stack flow rate limiting unit 630.

The stack flow rate limiting unit 630 outputs the smaller one of the stack request flow rate and the excessive drying prevention request flow rate as the stack flow rate. For example, if the excessive drying prevention request flow rate is smaller than the stack request flow rate, the stack flow rate limiting unit 630 outputs the excessive drying prevention request flow rate to the compressor target flow rate setting unit 650.

The hydrogen dilution request flow rate calculation unit 640 calculates a compressor flow rate for reducing a hydrogen concentration in the anode gas diluted by the cathode gas to or below a specified value (hereinafter, referred to as a "hydrogen dilution request flow rate") on the basis of the purge flow rate.

The purge flow rate is a discharge amount of the anode off-gas purged from the purge valve 29. For example, the purge flow rate is calculated on the basis of an opening degree of the purge valve 29.

For example, the hydrogen dilution request flow rate calculation unit 640 increases the hydrogen dilution request flow rate as the purge flow rate increases so that the hydrogen concentration does not exceed the specified value. The hydrogen dilution request flow rate calculation unit 640 outputs that calculation result to the compressor target flow rate setting unit 650.

The compressor target flow rate setting unit 650 outputs the larger one of the stack flow rate and the hydrogen dilution request flow rate as the compressor target flow rate. For example, if the hydrogen dilution request flow rate is larger than the stack flow rate, the compressor target flow rate setting unit 650 outputs the hydrogen dilution request flow rate to the commanding unit 400.

As just described, the warm-up request flow rate is set at the compressor target flow rate when the warm-up request flow rate is smaller than the excessive drying prevention request flow rate and larger than the hydrogen dilution request flow rate if the warm-up flag has been set on. Since the cathode gas is supplied from the compressor 12 to the fuel cell stack 1 and the anode gas is supplied to the fuel cell stack 1 by the anode pressure control valve 24 during the stop of the fuel cell stack 1 in this way, the fuel cell stack 1 can be caused to generate power to be warmed up.

Figure 8:
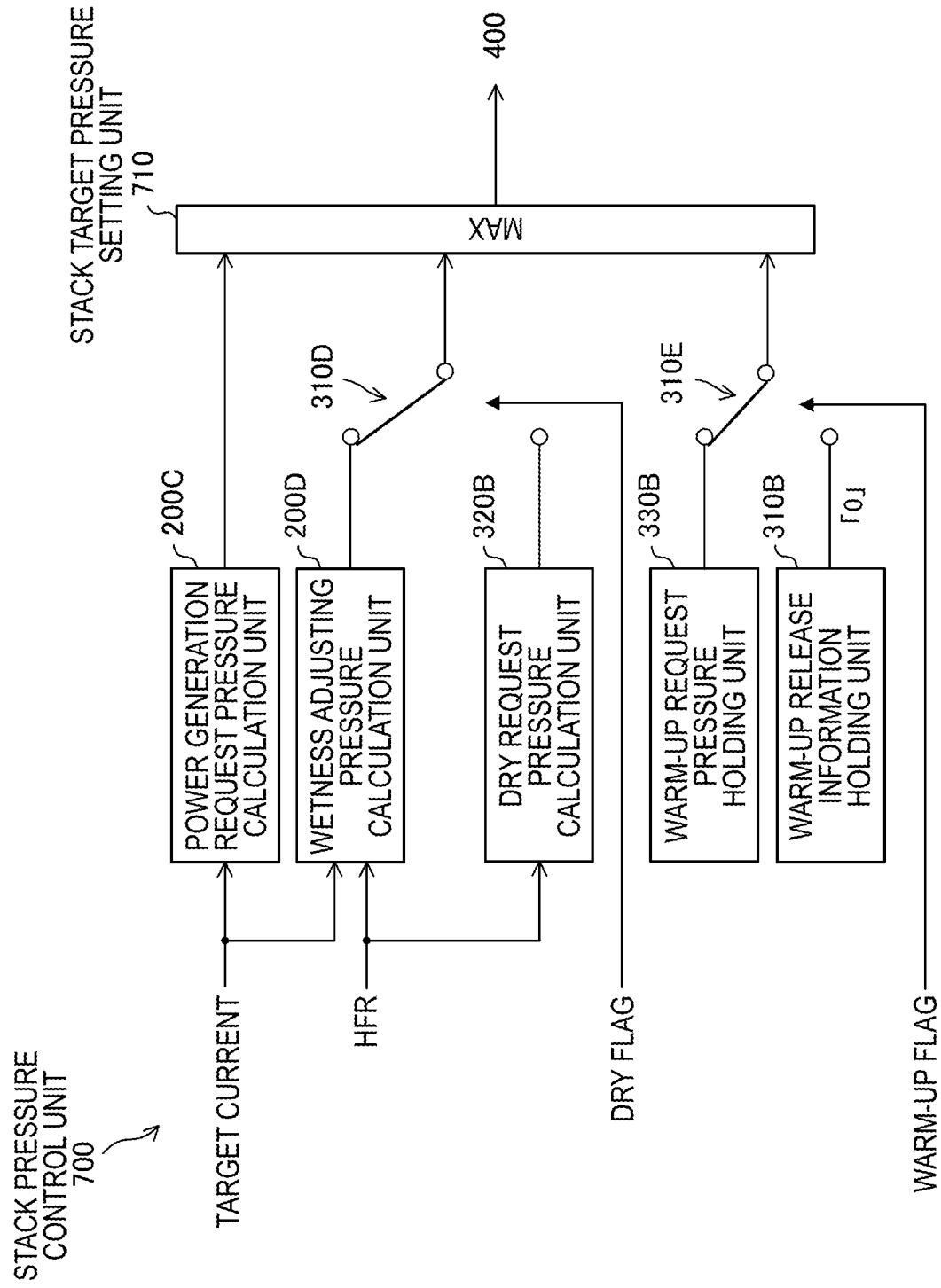
FIG. 8 is a block diagram showing a configuration for controlling a pressure of the cathode gas to be supplied to the fuel cell stack.

FIG. 8 is a block diagram showing an example of a detailed configuration of the stack pressure control unit 700.

The stack pressure control unit 700 controls a pressure of the cathode gas to be supplied to the fuel cell stack 1 (hereinafter, referred to as a "stack pressure").

The stack pressure control unit 700 includes a power generation request pressure calculation unit 200C, a wetness adjusting pressure calculation unit 200D, a switcher 310D, a warm-up release information holding unit 310B, a switcher 310E, a dry request pressure calculation unit 320B and a warm-up request pressure holding unit 330B. Further, the stack pressure control unit 700 includes a stack target pressure setting unit 710.

The power generation request pressure calculation unit 200C calculates a stack pressure necessary for the power generation of the fuel cell stack 1 (hereinafter, referred to as a "power generation request pressure") on the basis of the target current of the fuel cell stack 1. It should be noted that the power generation request pressure calculation unit 200C constitutes the power generation request control unit 200 shown in FIG. 2.

The power generation request pressure calculation unit 200C increases the power generation request pressure as the target current increases so that the amount of power generation of the fuel cell stack 1 increases. For example, a power generation request pressure map indicating a relationship between the target current and the power generation request pressure is stored in advance in the power generation request pressure calculation unit 200C. The power generation request pressure map is set on the basis of experimental data and the like.

Further, the power generation request pressure calculation unit 200C may correct the power generation request pressure according to a partial pressure change of impurity gas such as steam and nitrogen in the cathode gas. For example, the power generation request pressure calculation unit 200C increases the power generation request pressure as an atmospheric pressure or the stack temperature increases. The power generation request pressure calculation unit 200C outputs that calculation result to the stack pressure setting unit 710.

The wetness adjusting pressure calculation unit 200D calculates such a stack pressure that a wet/dry state of the electrolyte membranes reaches a targeted state (hereinafter, referred to as a "wetness adjusting pressure") on the basis of the HFR and the target current of the fuel cell stack 1. It should be noted that the wetness adjusting pressure calculation unit 200D constitutes the power generation request control unit 200 shown in FIG. 2.

The wetness adjusting pressure calculation unit 200D calculates the wetness adjusting pressure according to a difference between the HFR and the reference value determined in advance. For example, the wetness adjusting pressure calculation unit 200D reduces the wetness adjusting pressure to increase the discharge amount of steam carried out by the cathode gas if the HFR is smaller than the reference value, i.e. if the electrolyte membranes are wetter than in a targeted wet state.

The reference value of the HFR described above is set to reduce a water retention capacity of the electrolyte membranes within such a range that the electrolyte membranes are not deteriorated. Specifically, the reference value is set such that the electrolyte membranes are drier than in a wet/dry state suitable for power generation. This can prevent water retained in the electrolyte membranes from being frozen to freeze the electrolyte membranes after the stop of the fuel cell system 100.

Further, the wetness adjusting pressure calculation unit 200D reduces the wetness adjusting pressure as the target current increases since the amount of steam generated by power generation increases, and increases the wetness adjusting pressure as the target current decreases since the amount of generated steam decreases.

A wetness adjusting pressure map indicating a relationship between the HFR and the wetness adjusting pressure is stored for each target current determined in advance in the wetness adjusting pressure calculation unit 200D. When receiving the target current and the HFR, the wetness adjusting pressure calculation unit 200D refers to the wetness adjusting pressure map specified by that target current and calculates the wetness adjusting pressure associated with that HFR. The wetness adjusting pressure calculation unit 200D outputs that calculated wetness adjusting pressure to the stack target pressure setting unit 710.

The dry request pressure calculation unit 320B calculates a pressure of the cathode gas to be supplied to the fuel cell stack 1 to set the electrolyte membranes in a predetermined dry state (hereinafter, referred to as a "dry request pressure") on the basis of the HFR of the fuel cell stack 1. Specifically, the dry request pressure calculation unit 320B outputs the dry request pressure to execute the dry operation. It should be noted that the dry request pressure calculation unit 320B constitutes the dry operation unit 320 shown in FIG. 2.

The dry request pressure calculation unit 320B increases the dry request pressure to reduce the discharge amount of steam carried out by the cathode gas as the HFR increases, i.e. as the electrolyte membranes approach the predetermined dry state.

In the present embodiment, a dry request pressure map indicating a relationship between the HFR and the dry request pressure is stored in advance in the dry request pressure calculation unit 320B. The dry request pressure map is described later with reference to FIG. 9.

The switcher 310D switches a value to be output to the stack target pressure setting unit 710 to the wetness adjusting pressure or the dry request pressure according to the set state of the dry flag. It should be noted that the switcher 310D constitutes the freezing prediction processing unit 310 shown in FIG. 2.

The switcher 310D outputs the dry request pressure to the stack target pressure setting unit 710 if the dry flag has been set on, i.e. if the dry operation is executed during the stop of the fuel cell system 100. On the other hand, the switcher 310D outputs the wetness adjusting pressure to the stack target pressure setting unit 710 if the dry flag has been set off, i.e. the dry operation is not executed.

The warm-up request pressure holding unit 330B holds a pressure of the cathode gas necessary for the warm-up of the fuel cell stack 1 (hereinafter, referred to as a "warm-up request pressure") to melt ice formed in the jet pump 25 after receiving a stop command of the fuel cell system 100. Specifically, the warm-up request pressure holding unit 330B outputs the warm-up request pressure to execute the warm-up operation. It should be noted that the warm-up request pressure holding unit 330B constitutes the warm-up operation unit 330 shown in FIG. 2.

The warm-up request pressure is set to increase the power consumption of the compressor 12 and set at a value larger than the dry request pressure. It should be noted that the warm-up request pressure is not limited to a fixed value and may be set at a smaller value, for example, as the temperature of the fuel cell stack 1 increases.

The warm-up release information holding unit 310B holds zero as a value for releasing the warm-up operation.

The switcher 310E switches a value to be output to the stack target pressure setting unit 710 to the warm-up request pressure or zero according to the set state of the warm-up flag. It should be noted that the switcher 310E constitutes the freezing prediction processing unit 310 shown in FIG. 2.

The switcher 310E outputs the warm-up request pressure to the stack target pressure setting unit 710 if the warm-up flag has been set on, i.e. if the warm-up operation is executed during the stop of the fuel cell system 100. On the other hand, the switcher 310E outputs zero as the value for releasing the warm-up operation to the stack target pressure setting unit 710 if the warm-up flag has been set off, i.e. if the warm-up operation is not executed.

The stack target pressure setting unit 710 outputs the largest one of the power generation request pressure, the wetness adjusting pressure or the dry request pressure output from the switcher 310E and the warm-up request pressure or zero output from the switcher 310E as a stack target pressure to the commanding unit 400.

The stack target pressure setting unit 710 outputs the warm-up request pressure larger than the dry request pressure to the commanding unit 400, for example, if the dry flag and the warm-up flag are both set on when a stop command is received. Specifically, the warm-up operation is preferentially executed.

The reason for this is that the discharge amount of steam carried out by the cathode gas does not increase very much even if the pressure of the cathode gas is reduced since the amount of saturated steam in the fuel cell stack 1 is very small when the temperature of the fuel cell stack 1 is lower than 0° C.

By increasing the pressure of the cathode gas on the contrary, the power consumption of the compressor 12 increases and the amount of power generation of the fuel cell stack 1 increases, wherefore a temperature increase of the fuel cell stack 1 can be promoted. Since the amount of saturated steam in the fuel cell stack 1 increases in this way, the discharge amount of steam can be increased and the fuel cells can be dried early as compared to the case where the pressure of the cathode gas is reduced.

Figure 9:
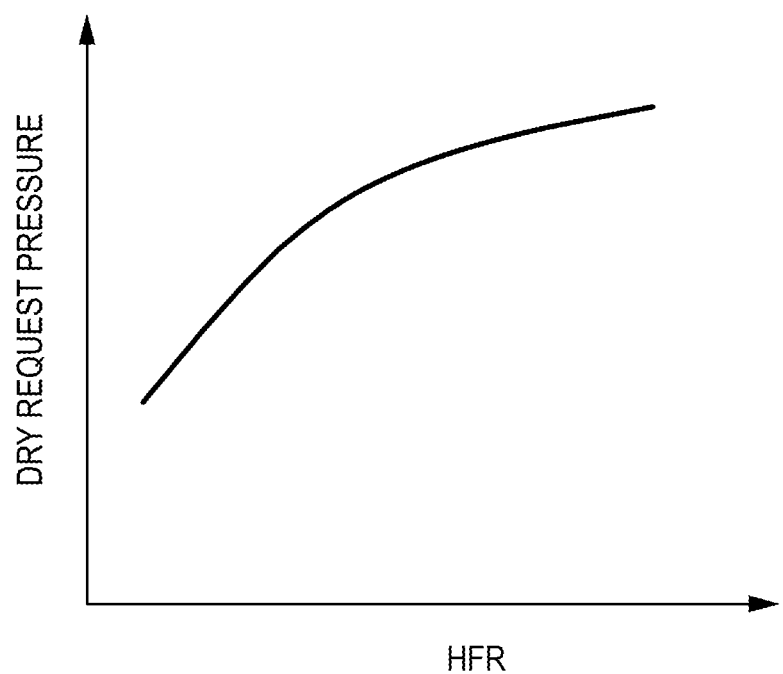
FIG. 9 is a graph showing a dry request pressure map.

FIG. 9 is a graph showing the dry request pressure map set in the dry request pressure calculation unit 320B. Here, a horizontal axis represents the HFR of the fuel cell stack 1 and a vertical axis represents the dry request pressure.

The dry request pressure map is set to reduce the dry request pressure as the HFR decreases, i.e. as the electrolyte membranes of the fuel cells become wetter. In this way, the discharge amount of steam carried out from the fuel cell stack 1 by the cathode gas increases as the HFR decreases. Further, the dry request pressure is set at a value smaller than the warm-up request pressure.

Figure 10:
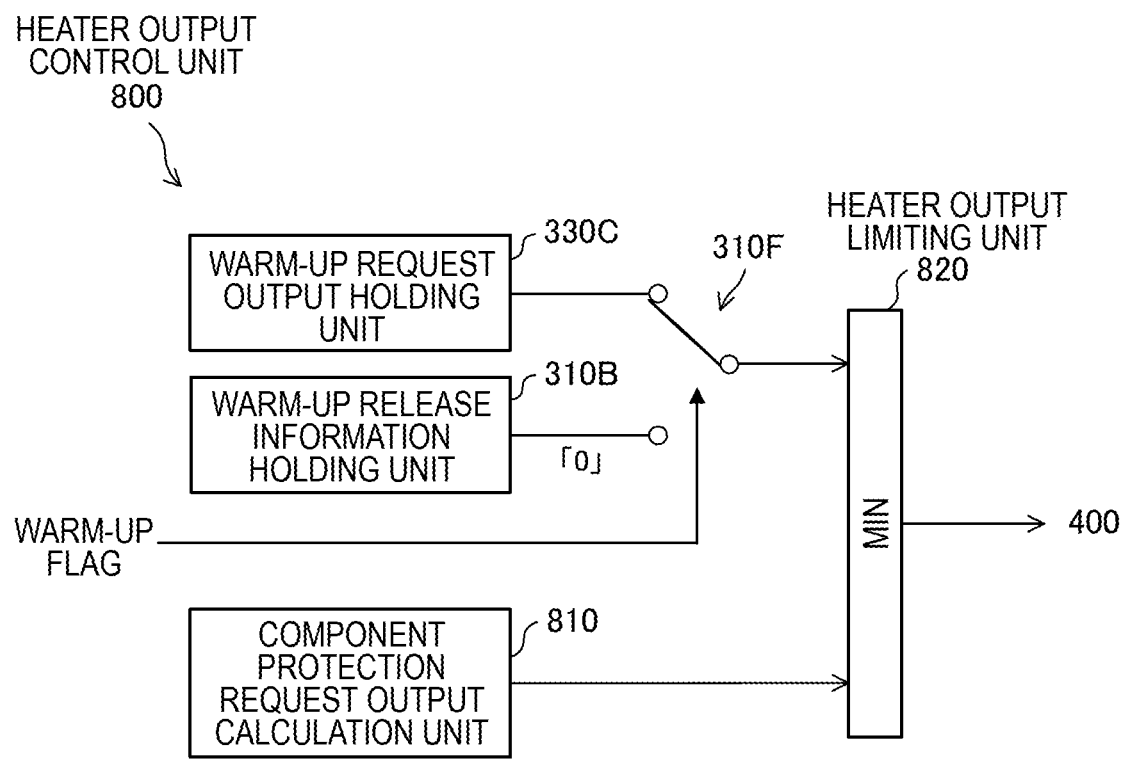
FIG. 10 is a diagram showing a configuration for controlling an output of a heater for warming cooling water of the fuel cell stack.

FIG. 10 is a block diagram showing an example of a detailed configuration of the heater output control unit 800.

The heater output control unit 800 controls the amount of generated heat output from the heater 35 (hereinafter, referred to as a "heater output").

The heater output control unit 800 includes a warm-up release information holding unit 310B, a switcher 310F, a warm-up request output holding unit 330C, a component protection request output calculation unit 810 and a heater output limiting unit 820.

The warm-up request output holding unit 330C holds a heater output determined to warm up the fuel cell stack 1 (hereinafter, referred to as a "warm-up request output") after receiving a stop command of the fuel cell system 100. Specifically, the warm-up request output holding unit 330C outputs the warm-up request output to execute the warm-up operation. It should be noted that the warm-up request output holding unit 330C constitutes the warm-up operation unit 330 shown in FIG. 2.

The warm-up request output is, for example, set at a maximum value of a variable range of the heater output to remove ice in the jet pump 25. It should be noted that the warm-up request output is not limited to a fixed value and may be changed, for example, according to the temperature state of the fuel cell stack 1.

The warm-up release information holding unit 310B holds zero as a value for releasing the warm-up operation.

The switcher 310F switches a value to be output to the heater output limiting unit 820 to the warm-up request output or zero according to the set state of the warm-up flag. It should be noted that the switcher 310F constitutes the freezing prediction processing unit 310 shown in FIG. 2.

The switcher 310F outputs the warm-up request output to the heater output limiting unit 820 if the warm-up flag has been set on, i.e. if the warm-up operation is executed during the stop of the fuel cell system 100. On the other hand, the switcher 310F outputs zero as the value for releasing the warm-up operation to the heater output limiting unit 820 if the warm-up flag has been set off, i.e. if the warm-up operation is not executed.

The component protection request output calculation unit 810 calculates a heater output for protecting components provided in a cooling water circulation passage 31 from overheating of the cooling water (hereinafter, referred to as a "component protection request output"). For example, the component protection request output calculation unit 810 reduces the component protection request output so as not to exceed a heat resistant temperature of the heater 35 as the stack temperature increases. The component protection request output calculation unit 810 outputs a calculation result to the heater output limiting unit 820.

The heater output limiting unit 820 outputs the smaller one of the warm-up request output or zero output from the switcher 310F and the component protection request output as a heater target output.

For example, the heater output limiting unit 820 outputs the warm-up request output to the commanding unit 400 when the warm-up request output is smaller than the component protection request output if the warm-up flag has been set on. Since power is supplied to the heater 35 in this way during the stop of the fuel cell stack 1, the fuel cell stack 1 can be warmed up.

Figure 11:
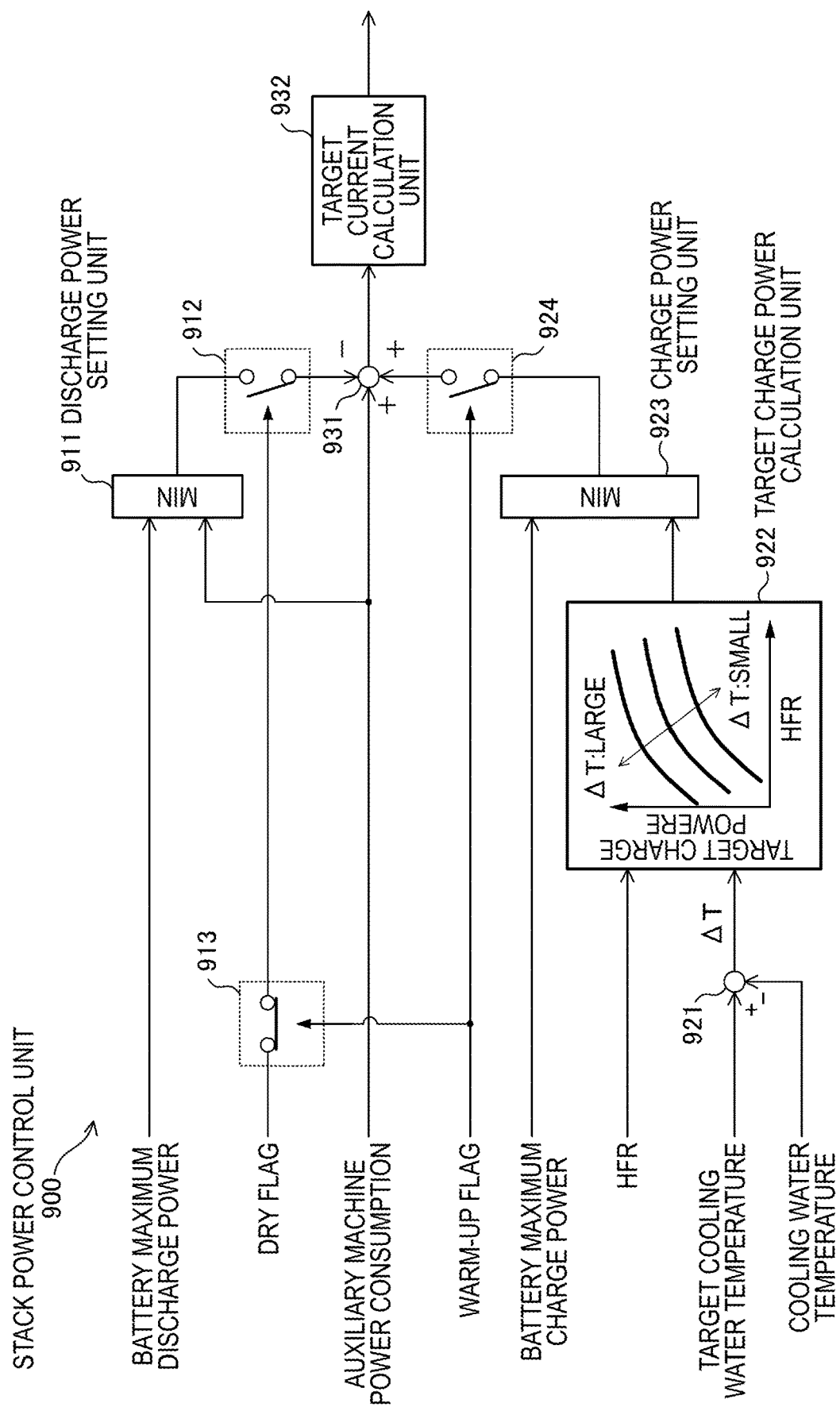
FIG. 11 is a block diagram showing a configuration for controlling power of the fuel cell stack, FIG. 12 are time charts when a dry/warm-up operation is executed during a stop process of the fuel cell system, FIG. 13 are time charts showing a controlled state of the cathode gas during the dry/warm-up operation, FIG. 14 are time charts when a dry/warm-up operation is executed after the stop of a fuel cell system in a third embodiment of the present invention.

FIG. 11 is a block diagram showing an example of a detailed configuration of the stack power control unit 900.

The stack power control unit 900 controls power generated by the fuel cell stack 1 utilizing the battery 2 (hereinafter, referred to as a "stack power").

The stack power control unit 900 includes a discharge power setting unit 911, switchers 912 and 913, a subtractor 921, a target charge power calculation unit 922, a charge power setting unit 923, a switcher 924, a stack power calculator 931 and a target current calculation unit 932.

The discharge power setting unit 911 outputs the smaller one of battery maximum discharge power and auxiliary machine power consumption as discharge power to the switcher 912. The battery maximum discharge power is calculated on the basis of an SOC (State Of Charge) of the battery 2.

The auxiliary machine power consumption is calculated on the basis of the power consumption of the compressor 12, that of the heater 35 and that of the other auxiliary machines. The power consumption of the compressor 12 is calculated on the basis of the compressor target flow rate and the target power, and the power consumption of the heater 35 is calculated from the heater target output. For example, the power consumptions of the compressor 12 and the heater 35 are both set at maximum values during the warm-up operation, and the power consumption of the heater 35 is switched to zero during the dry operation.

The switcher 912 switches a value to be output to the stack power calculator 931 to the discharge power from the battery 2 or zero according to a control signal output from the switcher 913. The switcher 912 outputs the discharge power of the battery 2 to the stack power calculator 931 when a control signal of H (High) level is output from the switcher 913 and outputs zero to the stack power calculator 931 when a control signal of L (Low) level is output.

The switcher 913 switches a level of the control signal to be output to the switcher 912 according to the set state of the warm-up flag. The switcher 913 outputs a control signal of L level if the warm-up flag has been set on.

If the warm-up flag has been set off, the switcher 913 outputs a control signal corresponding to the set state of the warm-up flag. If the warm-up flag has been set off, the switcher 913 outputs a control signal of H level when the dry flag is set on and outputs a control signal of L level when the dry flag is set off.

Specifically, power is discharged from the battery 2 to the auxiliary machines if the dry flag has been set on, and the supply of power from the battery 2 to the auxiliary machines is stopped regardless of the set state of the dry flag if the warm-up flag has been set on.

The subtractor 921 calculates a deviation ΔT of the cooling water temperature by subtracting a detection value of the cooling water temperature from a target value of the cooling water circulating through the fuel cell stack 1 (target cooling water temperature).

The target charge power calculation unit 922 calculates target charge power from the fuel cell stack 1 to the battery 2 on the basis of the HFR and the deviation $\Delta T$ of the cooling water temperature. The target charge power calculation unit 922 increases the target charge power as the HFR increases. Further, the target charge power calculation unit 922 increases target power as the deviation $\Delta T$ of the cooling water temperature increases.

The charge power setting unit 923 sets the smaller one of the battery maximum charge power and the target charge power as charge power to the switcher 924. The battery maximum charge power is calculated on the basis of the SOC of the battery 2.

The switcher 924 switches a value to be output to the stack power calculator 931 to the charge power or zero from the charge power setting unit 923 according to the set state of the warm-up flag.

The switcher 924 outputs the charge power set by the charge power setting unit 923 to the stack power calculator 931 if the warm-up flag has been set on, and outputs zero to the stack power calculator 931 if the warm-up flag has been set off.

The stack power calculator 931 calculates the target power of the fuel cell stack 1 by subtracting the discharge power output from the switcher 912 from the auxiliary machine power consumption and adding the charge power output from the switcher 924 to the auxiliary machine power consumption.

For example, if the warm-up flag has been set on, the stack power calculator 931 calculates a value obtained by adding the charge power to the auxiliary machine power consumption as the target power of the fuel cell stack 1 regardless of the set state of the dry flag. In this way, power is supplied not only to the auxiliary machines, but also to the battery 2 from the fuel cell stack 1 in the warm-up operation, wherefore the generated power of the fuel cell stack 1 increases to promote the warm-up.

Further, if the warm-up flag has been set off, the stack power calculator 931 calculates a value obtained by subtracting the discharge power from the auxiliary machine power consumption as the target power of the fuel cell stack 1 when the dry flag is set on. In this way, power is supplied to the auxiliary machines from the battery 2 in the dry operation, wherefore the generation of steam associated with the power generation of the fuel cell stack 1 can be suppressed.

The target current calculation unit 932 refers to an IV characteristic of the fuel cell stack 1 and calculates the target current on the basis of the target power of the fuel cell stack 1.

As described above, in the case of receiving a stop command, the compressor target flow rate, the stack target pressure and the heater target output are respectively set at warm-up request values determined to warm up the fuel cell stack 1 when the warm-up flag is set on. Further, if a capacity of the battery 2 has a margin, power is supplied to the auxiliary machines and power is also charged into the battery 2 from the fuel cell stack 1. In this way, the fuel cell system 100 executes the warm-up operation.

Further, in the case of receiving a stop command, the stack target flow rate is normally set at the dry request flow rate determined to dry the electrolyte membranes when the dry flag is set on. In this way, the dry operation is executed.

Furthermore, in the case of receiving a stop command, only the stack target flow rate is set at the dry request flow rate and the stack target pressure, the compressor target flow rate and the heater target output are respectively set at the warm-up request values when the dry flag and the warm-up flag are both set on. Specifically, a dry/warm-up operation is executed.

Next, a control technique of the fuel cell system 100 in the present embodiment is described with reference to the drawings.

Figure 12:
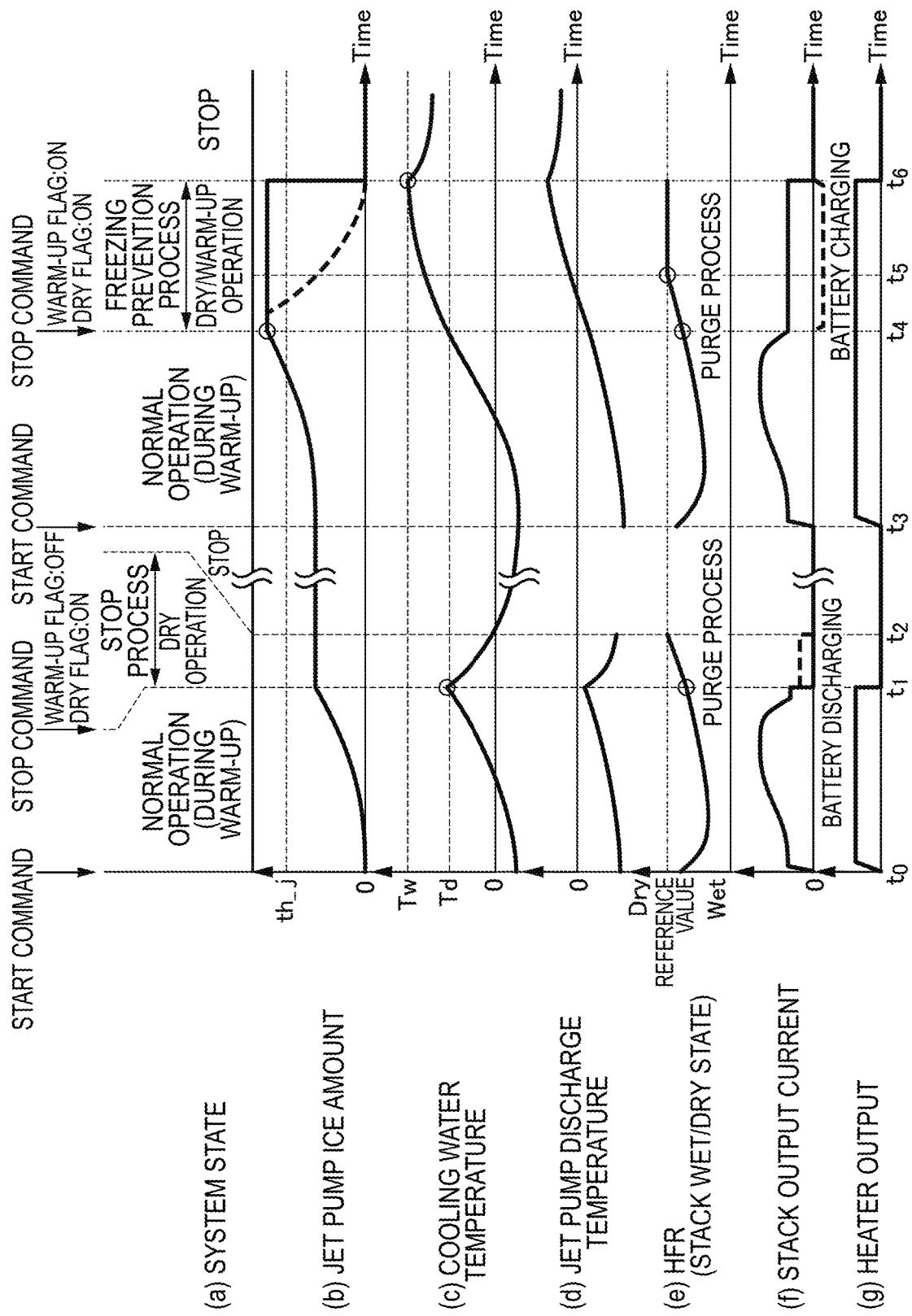

FIG. 12 are time charts showing an example of the control technique for executing the warm-up operation when the fuel cell system 100 is stopped.

FIG. 12(*a*) is a chart showing a charge of an operating state of the fuel cell system 100. FIG. 12(*b*) is a chart showing a change of the amount of ice formed in the jet pump 25. In FIG. 12(*b*), a calculation result of the amount of ice formed in the jet pump 25 is shown by a solid line and an actual amount of ice is shown by a broken line.

FIG. 12(*c*) is a chart showing the temperature of the cooling water circulated to the fuel cell stack 1. The cooling water temperature is used as the temperature of the fuel cell stack 1 and, in the present embodiment, an average value of the stack inlet water temperature and the stack outlet water temperature. FIG. 12(*d*) is a chart showing a change of the discharge temperature of the anode gas discharged from the jet pump 25 (post-joining gas temperature).

FIG. 12(*e*) is a chart showing a change of the HFR measured by the stack resistance measuring device 45. The HFR is a parameter correlated with the wet/dry state of the electrolyte membranes. FIG. 12(*f*) is a chart showing a change of a current output to a load from the fuel cell stack 1 (stack output current). In FIG. 12(*f*), the stack output current is shown by a solid line and charge/discharge of the battery 2 is shown by a broken line.

FIG. 12(*g*) is a chart showing a change of the amount of generated power output from the heater 35. A horizontal axis of each of FIGS. 12(*a*) to 12(*g*) is a time axis common to each other.

At time t0, the fuel cell system 100 is started in a temperature environment where the cooling water temperature is lower than 0° C. as shown in FIG. 12(*c*). In this way, the anode gas and the cathode gas are supplied to the fuel cell stack 1, the fuel cell stack 1 generates power as shown in FIG. 12(*f*) and a current is taken out from the fuel cell stack 1.

Since the temperature of the fuel cell stack 1 is lower than 0° C., the controller 101 executes the warm-up operation for warming up the fuel cell stack 1 while generating power required from the electric motor. For example, the controller 101 sets the rotation speed of the compressor 12 at an upper limit value of a variable range and sets the output of the heater 35 at an upper limit value of a variable range to increase the amount of self-heat generation by increasing the amount of power generation of the fuel cell stack 1.

Further, since steam is generated according to the power generation of the fuel cell stack 1, the HFR decreases as shown in FIG. 12(*f*). Further, the cooling water temperature increases due to self-heat generation and the heat radiation of the heater 35 as shown in FIG. 12(*c*). Associated with this, the temperature of the anode off-gas to be sucked into the jet pump 25 increases, wherefore the discharge temperature of the jet pump 25 increases as shown in FIG. 12(*d*).

At this time, the discharge temperature of the jet pump 25 is lower than 0° C. as shown in FIG. 12(*d*). Thus, steam in the anode off-gas sucked into the jet pump 25 is frozen in the jet pump 25 and the amount of ice in the jet pump 25 gradually increases as shown in FIG. 12(*b*).

At time t1, a stop command for stopping the power generation of the fuel cell stack 1 is output and the stop process for stopping the fuel cell stack 1 is performed.

At this time, since the amount of ice in the jet pump 25 is smaller than the freezing prevention threshold value Th_j as shown in FIG. 12(b), the warm-up flag is set off.

On the other hand, since the HFR is smaller than the reference value as shown in FIG. 12(e) and the electrolyte membranes are wet, the dry flag is set on. Further, since the cooling water temperature is higher than the dry request temperature Td as shown in FIG. 12(c), only the dry operation is executed without executing the warm-up operation for the dry operation.

In the dry operation, the stack flow rate control unit 500 shown in FIG. 6 sets the dry request flow rate at the stack target flow rate. Together with this, the controller 101 opens the purge valve 29 and discharges steam from the fuel cell stack 1. In this way, steam is carried out from the fuel cell stack 1 to dry the electrolyte membranes.

Further, to suppress the generation of water associated with power generation, the stack power control unit 900 shown in FIG. 11 causes drive power for the compressor 12 to be discharged from the battery 2 as shown by a broken line of FIG. 12(f).

At time t2, the HFR increases to the reference value as shown in FIG. 12(e) and the electrolyte membranes reaches a predetermined dry state. Thus, the controller 101 closes the cathode pressure control valve 14, stops the compressor 12 and closes both the anode pressure control valve 24 and the purge valve 29. In this way, the fuel cell system 100 is set in a stop state.

Thereafter, since the fuel cell stack 1 is cooled by outside air, the cooling water temperature decreases to a temperature lower than the freezing point as at time t0 as shown in FIG. 12(c). Thus, the amount of ice in the jet pump 25 remains without decreasing.

Subsequently, at time t3, the fuel cell system 100 is restarted and, as shown in FIG. 12(f), the fuel cell stack 1 generates power and a current is taken out from the fuel cell stack 1. According to the power generation of the fuel cell stack 1, the cooling water temperature increases as shown in FIG. 12(c) as during a period from time t0 to time t1 and the HFR decreases as shown in FIG. 12(e).

At time t4, a stop command of the fuel cell stack 1 is output and a stop process for stopping the fuel cell system 100 is performed.

At this time, the warm-up flag is set on since the amount of ice in the jet pump 25 is larger than the freezing prevention threshold value Th_j as shown in FIG. 12(b), and the dry flag is set on since the HFR is smaller than the reference value as shown in FIG. 12(e). In this way, the dry/warm-up operation is executed.

In the dry/warm-up operation, the compressor flow rate control unit 600 shown in FIG. 7 sets the warm-up request flow rate at the compressor target flow rate and the stack pressure control unit 700 shown in FIG. 8 sets the warm-up request pressure at the stack target pressure. Along with this, the heater output control unit 800 shown in FIG. 10 sets the heater target output at the warm-up request output.

In this way, the fuel cell stack 1 generates power and heat as shown in FIG. 12(f) and the fuel cell stack 1 is warmed also by heat generated by the heater 35 as shown in FIG. 12(g). Thus, the cooling water temperature increases as shown in FIG. 12(c) and, associated with this, the discharge temperature of the jet pump 25 increases as shown in FIG. 12(d). When the discharge temperature becomes higher than 0° C., ice formed in the jet pump 25 melts to reduce the amount of ice as shown by a broken line of FIG. 12(b).

Further, in the dry/warm-up operation, the stack flow rate control unit 500 shown in FIG. 6 sets the dry request flow rate at the stack target flow rate and the controller 101 opens the purge valve 29 and discharges steam from the fuel cell stack 1.

In this way, the discharge amount of steam carried out from the fuel cell stack 1 increases, wherefore the electrolyte membranes of the fuel cells are dried. Thus, the HFR increases as shown in FIG. 12(e).

Further, in the dry/warm-up operation, the stack power control unit 900 shown in FIG. 11 not only causes power to be supplied to the auxiliary machines from the fuel cell stack 1, but also causes power to be charged into the battery 2 as shown by a broken line of FIG. 12(f) since the charge capacity of the battery 2 has a margin. Since the amount of heat generation of the fuel cell stack 1 increases in this way, the warm-up of the fuel cell stack 1 can be promoted.

By executing the dry operation to increase the flow rate of the cathode gas while warming up the fuel cell stack 1 in this way, the electrolyte membranes can be efficiently dried and ice in the jet pump 25 can be melted early.

At time t5, the HFR increases to the reference value as shown in FIG. 12(e) and the dry flag is switched off. Associated with this, the stack flow rate control unit 500 switches the stack target flow rate from the dry request flow rate to the wetness adjusting flow rate and the stack pressure control unit 700 switches the stack target pressure from the dry request pressure to the warm-up request pressure. Thus, the dry operation is stopped and only the warm-up operation is executed.

Since the stack target pressure increases due to a switch from the dry/warm-up operation to the warm-up operation, power consumed by the compressor 12 increases and generated power of the fuel cell stack 1 increases. Thus, the amount of heat generation of the fuel cell stack 1 increases, wherefore the temperature of the fuel cell stack 1 can be more quickly increased.

At time t6, the cooling water temperature reaches the thaw request temperature Tw set at the warm-up completion threshold value Th_e as shown in FIG. 12(c) and the amount of ice in the jet pump 25 becomes zero as shown in FIG. 12(b). Thus, the warm-up operation is stopped and, thereafter, the fuel cell system 100 is stopped.

As just described, the controller 101 judges that there is a possibility of closing the flow passage of the jet pump 25 during restart when the amount of ice in the jet pump 25 is larger than the freezing prevention threshold value Th_j in the case of receiving a stop command of the fuel cell system 100. At this time, the controller 101 continues the warm-up of the fuel cell stack 1 until the cooling water temperature reaches the warm-up completion threshold value Th_e unless the warm-up of the fuel cell stack 1 has been completed.

Since ice formed in the jet pump 25 is removed in this way, the jet pump 25 can be prevented from being frozen to close the flow passage during the next start.

Further, if the amount of ice in the jet pump 25 is not larger than the freezing prevention threshold value Th_j in the case of receiving the stop command of the fuel cell system 100, the controller 101 prohibits (stops) the warm-up of the fuel cell stack 1. In this way, the number of execution times of the warm-up operation executed in stopping the fuel cell system 100 can be reduced.

Figure 13:
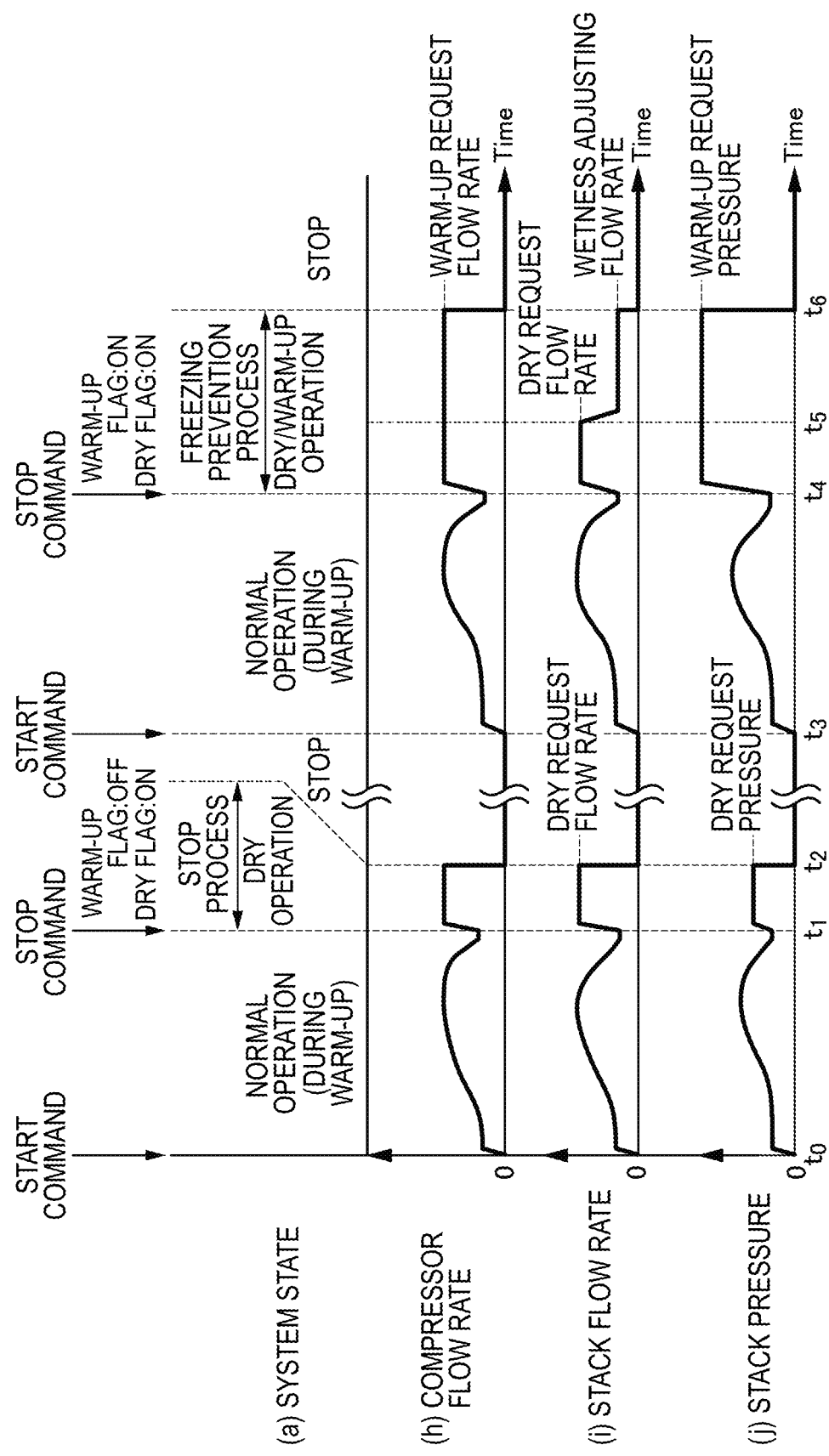

FIG. 13 are time charts showing a state of the cathode gas when the control shown in FIG. 12 is executed.

FIG. 13(h) is a chart showing a change of the flow rate of the cathode gas discharged from the compressor 12 (compressor flow rate). FIG. 13(i) is a chart showing a change of the flow rate of the cathode gas to be supplied to the fuel cell stack 1 (stack flow rate). FIG. 13(j) is a chart showing a change of the pressure of the cathode gas to be supplied to the fuel cell stack 1 (stack pressure).

A horizontal axis of each of FIGS. 13(h) to 13(j) is a time axis common to the horizontal axis of each of FIGS. 12(a) to 12(g).

Since only the dry operation is executed during a period from time t1 to time t2, the stack flow rate is set at the dry request flow rate as shown in FIG. 13(i) and the stack pressure is set at the dry request pressure as shown in FIG. 13(j).

Since the dry/warm-up operation is executed during a period from time t4 to time t5, the compressor flow rate is set at the warm-up request flow rate as shown in FIG. 13(h), the stack flow rate is set at the dry request flow rate as shown in FIG. 13(i) and the stack pressure is set at the warm-up request pressure as shown in FIG. 13(j).

Here, as shown in FIG. 13(j), the stack pressure is set not at the dry request pressure, but at the warm-up request pressure. The reason for this is that the discharge amount of steam carried out by the cathode gas can be increased as compared to the case where the stack pressure is set at the dry request pressure since the amount of steam in the cathode gas increases by increasing the power consumption of the compressor 12 to warm up the fuel cell stack 1.

Since only the warm-up operation is executed during a period from time t5 to time t6, the stack flow rate is switched from the dry request flow rate to the wetness adjusting flow rate as shown in FIG. 13(i). At this time, the cathode gas is discharged at a flow rate obtained by subtracting the wetness adjusting flow rate from the dry request flow rate to the cathode gas discharge passage 13 from the bypass valve 16.

According to the second embodiment of the present invention, the operation unit 311 executes the warm-up operation for warming up the fuel cell stack 1 on the basis of the temperature of the fuel cell stack 1 in the case of receiving a stop command of the fuel cell system 100. In the present embodiment, the cooling water temperature correlated with the temperature of the fuel cell stack 1 is used as a parameter (temperature of the fuel cell system 100) for predicting the freezing of the jet pump 25.

Further, in the present embodiment, the freezing prediction processing unit 310 predicts that the jet pump 25 will be frozen unless the cooling water has increased to the warm-up completion threshold value Th_e in the case of receiving the stop command. Thus, the operation unit 311 executes the warm-up operation to continue the warm-up of the fuel cell stack 1 unless the cooling water has increased to the warm-up completion threshold value Th_e in the case of receiving the stop command. The warm-up completion threshold value Th_e is a temperature at which ice generated in the jet pump 25 can be removed and, for example, set at 60° C.

Since ice in the jet pump 25 can be reliably removed in this way, a situation can be avoided where the flow passage is closed by ice generated in the jet pump 25 and the anode gas cannot be supplied to the fuel cell stack 1 during the next start.

Further, in the present embodiment, the freezing prediction processing unit 310 calculates the amount of ice to be generated in the jet pump 25 on the basis of the temperature of the fuel cell system 100. The amount of ice in the jet pump 25 is calculated on the basis of the target current of the fuel cell stack 1, the supplied gas temperature, the stack temperature, the stack inlet pressure and the like, for example, as shown in FIG. 5.

Then, the freezing prediction processing unit 310 limits the warm-up of the fuel cell stack 1 if the calculated amount of ice is not larger than the freezing prevention threshold value Th_j.

Since the execution of unnecessary warm-up performed after the stop command of the fuel cell system 100 is reduced in this way, wasteful consumption of the anode gas can be suppressed. Further, since the necessity of the warm-up operation is judged using a calculation value of the amount of ice in the jet pump 25, the warm-up operation can be precisely limited.

Further, in the present embodiment, the operation execution unit 311 warms up the fuel cell stack 1 such that the fuel cell stack 1 reaches a predetermined dry state in the case of receiving the stop command and, thereafter, continues the warm-up of the fuel cell stack 1 until the cooling water temperature of the fuel cell stack 1 increases to the warm-up completion threshold value Th_e.

Since the flow rate of the cathode gas is increased while the flow rate of steam in the cathode off-gas is increased by executing the dry operation while executing the warm-up operation in this way, steam can be effectively discharged from the fuel cell stack 1.

Furthermore, in the present embodiment, the operation execution unit 311 warms up the fuel cell stack 1 when the amount of ice in the jet pump 25 is larger than the freezing prevention threshold value Th_j and the cooling water temperature is lower than the warm-up completion threshold value Th_e in the case of receiving the stop command. After the warm-up is completed, the system control unit 300 stops the compressor 12, closes the cathode pressure control valve 14 and closes the anode pressure control valve 24 and the purge valve 29 to set the fuel cell system 100 in the stop state.

Since the necessity of executing the warm-up operation is judged using not only the amount of ice in the jet pump 25, but also the cooling water temperature in this way, the warm-up operation can be precisely executed.

Further, in the present embodiment, the warm-up operation unit 330 increases the target current and causes the fuel cell stack 1 to generate power by charging power into the battery 2 from the fuel cell stack 1 in executing the warm-up operation. In this way, the warm-up of the fuel cell stack 1 can be promoted.

It should be noted that although an example of calculating the amount of ice in the jet pump 25 and executing the warm-up operation on the basis of that amount of ice in the present embodiment, there is no limitation to this.

For example, the freezing prediction processing unit 310 may count the number of times of stopping the fuel cell system 100 in a state where ice remains in the jet pump 25. Specifically, the freezing prediction processing unit 310 includes a counter and increases a count value by one every time the fuel cell system 100 is stopped in a state where the cooling water temperature correlated with the circulating gas temperature is lower than the freezing point. The operation execution unit 311 executes the warm-up operation if the counted number of times exceeds a predetermined value, e.g. five times.

Since the ice amount calculation unit 340 can be omitted by estimating the amount of ice in the jet pump 25 in this way, unnecessary warm-up operations can reduced while a calculation load is reduced.

Alternatively, the freezing prediction processing unit 310 may integrate a time when the temperature of the post-joining gas after the supplied gas and the circulating gas are joined in the jet pump 25 is lower than a predetermined temperature, e.g. 0° C. Then, the operation execution unit 311 executes the warm-up operation if that integration time elapses, e.g. several minutes.

In this case, the freezing prediction processing unit 310 may correct to shorten the integration time as the required power (target current) required to the fuel cell stack 1 increases since the temperature of the fuel cell stack 1 increases at a faster rate.

Specifically, a correction map generated to increase a correction amount as the required power increases is stored in the freezing prediction processing unit 310 and the freezing prediction processing unit 310 refers to the correction map, calculates the correction amount associated with the required power and subtracts the correction amount from the integration time. In this way, the necessity of the warm-up operation can be accurately determined.

Third Embodiment

Next, the configuration of a fuel cell system in a third embodiment of the present invention is described. In the present embodiment, the configuration of the fuel cell system is basically the same as in the second embodiment. Thus, the same components as those of the second embodiment are described while being denoted by the same reference signs.

In the present embodiment, a controller 101 includes an operation execution unit 311 configured to monitor a cooling water temperature as a parameter for predicting the freezing after a fuel cell system 100 is stopped instead of immediately after a stop command is received, and warm up a fuel cell stack 1 when a dry operation is executed.

Figure 14:
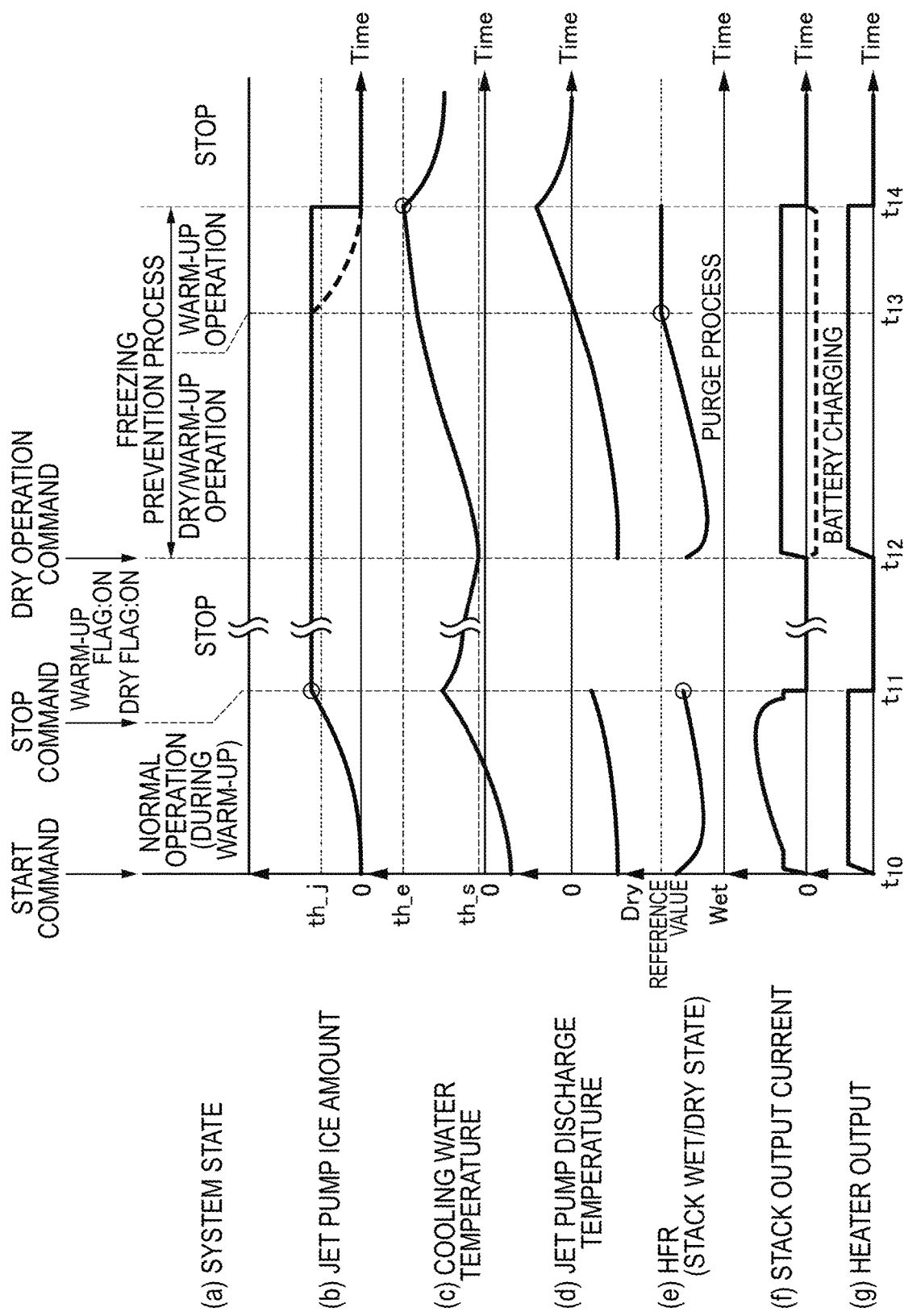

FIG. 14 are time charts showing a technique for executing a warm-up operation after the fuel cell system 100 is stopped.

A vertical axis of each of FIGS. 14(a) to 14(g) is the same as that of each of FIGS. 12(a) to 12(g). Further, a horizontal axis of each of FIGS. 14(a) to 14(g) is a time axis common to each other.

Since an operation from time t10 to time t11 is the same as the operation from time t0 to time t1 shown in FIGS. 12(a) to 12(g), it is not described here.

At time t11, the fuel cell system 100 is stopped after a stop command is output and the power generation of the fuel cell stack 1 is stopped. At this time, a warm-up flag is set on since the amount of ice in a jet pump 25 is larger than a freezing prevention threshold value Th_j as shown in FIG. 14(b), and a dry flag is set on since HFR is smaller than a reference value as shown in FIG. 14(e) and electrolyte membranes are in a wet state.

In the present embodiment, the controller 101 executes neither the dry operation nor the warm-up operation immediately after receiving the stop command and monitors a reduction of the cooling water temperature to a freezing prevention threshold value Th_s after the fuel cell system 100 is stopped.

The freezing prevention threshold value Th_s is a value determined on the basis of a freezing point temperature. The freezing prevention threshold value Th_s is set at a value, e.g. larger than 0° C. to prevent steam from being frozen inside the fuel cell stack 1.

At time t12, the cooling water temperature decreases to the freezing prevention threshold value Th_s as shown in FIG. 14(c). At this time, the controller 101 executes a dry/warm-up operation since the warm-up flag is set on.

Since the HFR increases to the reference value at time t13 as shown in FIG. 14(e), the controller 101 stops the dry operation and executes only the warm-up operation. Then, as shown in FIG. 14(d), a discharge temperature of the jet pump 25 becomes higher than 0° C. and the amount of ice in the jet pump 25 decreases as shown in FIG. 14(b).

At time t14, the cooling water temperature increases to a warm-up completion threshold value Th_e as shown in FIG. 14(c). In this way, ice in the jet pump 25 is removed as shown in FIG. 14(b). Then, a stop control unit 300 stops the warm-up operation and sets the fuel cell system 100 in a stop state.

According to the third embodiment of the present invention, a dry operation unit 320 of the controller 101 executes the dry operation when the cooling water temperature correlated with the temperature of the fuel cell stack 1 decreases to the freezing prevention threshold value Th_s after the fuel cell system 100 is stopped. Then, a warm-up operation unit 330 warms up the fuel cell stack 1 if the amount of ice in the jet pump 25 is larger than the freezing prevention threshold value Th_j when the dry operation is executed. It should be noted that the freezing prevention threshold value Th_s for the fuel cell stack 1 is not limited to a fixed value and may be changed according to a parameter for predicting the freezing.

By executing the warm-up operation during the dry operation after the stop of the fuel cell system 100 in this way, it is possible to prevent the freezing of fuel cells and also prevent the freezing of the jet pump 25.

Further, the lower the temperature of anode gas (supplied gas) supplied from a heat exchanger 23 to the jet pump 25 from the freezing point temperature, the larger the amount of ice formed in the jet pump during the dry operation. Thus, the freezing prediction processing unit 310 may set the freezing prevention threshold value Th_s for the fuel cells higher as the temperature of the supplied gas decreases.

Since the temperature of the circulating gas to be sucked into the jet pump 25 increases by increasing the freezing prevention threshold value Th_s for the fuel cells, the amount of ice newly generated during the dry operation decreases. Thus, the freezing of the jet pump 25 and the closure of a flow passage during the dry operation can be avoided.

Alternatively, the freezing prediction processing unit 310 may set the freezing prevention threshold value Th_s of the fuel cells higher as a difference between the amount of ice and the freezing prevention threshold value Th_s decreases if the amount of ice in the jet pump 25 is smaller than the freezing prevention threshold value Th_j.

If the amount of ice in the jet pump 25 is smaller than the freezing prevention threshold value Th_j, only the dry operation is executed without executing the warm-up operation for removing ice in the jet pump 25. Even in such an operating state, ice is newly generated in the jet pump 25 by the warm-up of the fuel cell stack 1 performed to dry the electrolyte membranes of the fuel cells during the dry operation. Associated with this, there is a possibility that the amount of ice in the jet pump 25 becomes larger than the freezing prevention threshold value Th_j and the flow passage of the jet pump 25 is closed.

As a measure against this, the amount of ice generated during the dry operation is reduced by setting the freezing prevention threshold value Th_s higher as the amount of ice approaches the freezing prevention threshold value Th_j if the amount of ice in the jet pump 25 is smaller than the freezing prevention threshold value Th_j. Thus, the closure of the jet pump 25 can be avoided.

Although the embodiments of the present invention have been described above, the above embodiments are merely an illustration of some application examples of the present invention and not intended to limit the technical scope of the present invention to the specific configurations of the above embodiments.

Figure 15:
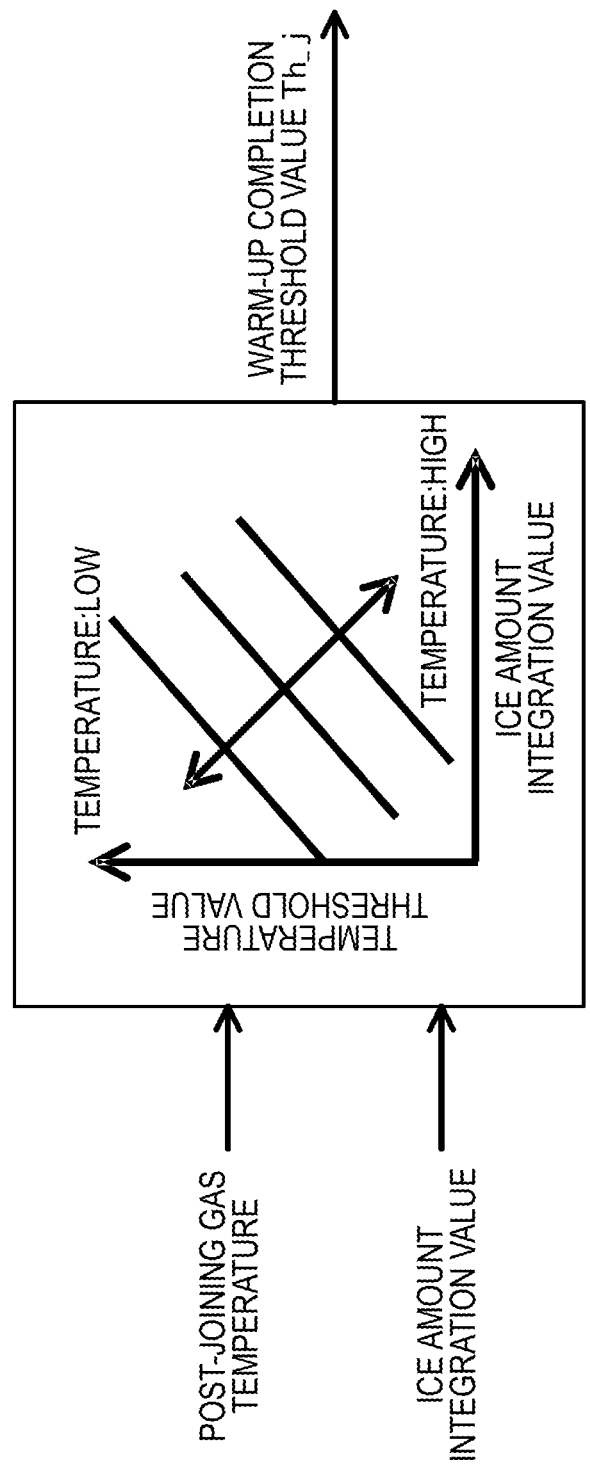
FIG. 15 is a chart showing a map for correcting a warm-up completion threshold value of a jet pump.

For example, although an example of using a fixed value as the warm-up completion threshold value (release temperature) Th_j of the jet pump 25 has been described in the present embodiment, the warm-up completion threshold value Th_j may be changed using a threshold value correction map as shown in FIG. 15.

FIG. 15 is a chart showing a technique for correcting the warm-up completion threshold value Th_j of the jet pump 25. A threshold value correction map indicating a relationship between an ice amount integration value and the warm-up completion threshold value for each post-joining gas temperature in the jet pump 25 is shown in FIG. 15.

The warm-up completion threshold value Th_j increases as the ice amount integration value increases since a longer time is required to melt all ice. Further, the warm-up completion threshold value Th_j decreases as the ice amount integration value increases and as the post-joining gas temperature decreases since ice is harder to melt.

By using the threshold value correction map in this way, all the ice formed in the jet pump 25 can be reliably melted.

Although whether or not to execute the warm-up operation is judged on the basis of the amount of ice in the jet pump 25 in the present embodiment, an enthalpy balance of the supplied gas of the jet pump 25, the circulating gas and the joined gas may be integrated and the warm-up operation may be executed on the basis of this integration value.

Further, although whether or not the warm-up has been completed has been judged on the basis of the cooling water temperature in the present embodiment, the temperature of the anode off-gas may be used instead of the cooling water temperature. In this way, the necessity of the warm-up can be more correctly judged. In this case, a temperature sensor may be provided in the anode gas circulation passage 26 and a detection signal output from the temperature sensor or an estimated value obtained by calculation may be used.

Further, the temperature of the gas after joining discharged from the jet pump 25 (discharged gas temperature) may be used as the temperature of the fuel cell system 100. In this case, the freezing of the jet pump 25 can be predicted, for example, on the basis of whether or not the discharged gas temperature has exceeded 0° C. The discharged gas temperature is calculated on the basis of the circulating gas temperature and the supplied gas temperature. Alternatively, a temperature sensor may be provided between the jet pump 25 and the fuel cell stack 1 in the anode gas supply passage 22 and a detection signal output from this temperature sensor may be used.

It should be noted that the above embodiments can be combined as appropriate.

The present application claims a priority based on Japanese Patent Application No. 2014-151272 filed with the Japan Patent Office on Jul. 24, 2014, all the contents of which are incorporated herein by reference.

The invention claimed is:

1. A fuel cell system for supplying anode gas and cathode gas to a fuel cell and causing the fuel cell to generate power according to a load, comprising:
   a component configured to circulate discharged gas comprising anode gas or cathode gas discharged from the fuel cell to an inlet of the fuel cell;
   a power generation control unit configured to control a power generation state of the fuel cell based on the load;
   a freezing prediction unit configured to predict freezing of the component based on a temperature received from a detection unit configured to detect a temperature of the fuel cell system; and
   an operation execution unit configured such that, while the fuel cell generates power, when the freezing of the component is predicted and a stop command to stop the power generation of the fuel cell has been received, the operation execution unit executes a warm-up operation before stopping the fuel cell in response to the stop command,
   wherein the power generation control unit is configured to calculate a flow rate of the cathode gas as a power generation request flow rate on the basis of the load,
   wherein the operation execution unit is configured to:
      compare a warm-up request flow rate of the cathode gas and the power generation request flow rate,
      set the warm-up request flow rate as the flow rate of the cathode gas during the warm-up operation when the warm-up request flow rate is greater than the power request flow rate generation, and
      set the power generation request flow rate as the flow rate of the cathode gas during the warm-up operation when the power generation request flow rate is greater than the warm-up request flow rate.

2. The fuel cell system according to claim 1, wherein:
   the freezing prediction unit is configured to predict the freezing of the component based on whether or not a temperature of the fuel cell has increased to a temperature at which ice is removed from the component; and
   the operation execution unit is configured to execute the warm-up operation if the temperature of the fuel cell has not increased to the temperature at which the ice is removed from the component.

3. The fuel cell system according to claim 1, wherein:
   the freezing prediction unit is configured to calculate an amount of ice generated in the component based on the temperature of the fuel cell system and to limit an execution of the warm-up operation if an amount of ice is not larger than a predetermined value.

4. The fuel cell system according to claim 3, wherein:
   the operation execution unit is configured to stop the fuel cell after the warm-up operation is executed if the amount of ice generated in the component is larger than the predetermined value.

5. The fuel cell system according to claim 1, wherein:
   the operation execution unit is configured to warm up the fuel cell such that the fuel cell reaches a predetermined level of dryness, and, thereafter, to continue the warmup operation based on the temperature of the fuel cell system.

6. The fuel cell system according to claim 1, further comprising:
   a dry operation unit configured to control the fuel cell to a predetermined level of dryness when a temperature of the fuel cell decreases to a predetermined threshold value after the fuel cell is stopped, wherein:
   when the dry operation unit controls the fuel cell to the predetermined level of dryness, the operation execution unit is configured to execute the warm-up operation based on the temperature of the fuel cell system.

7. The fuel cell system according to claim 6, wherein:
   the freezing prediction unit is configured to set the threshold value higher as a temperature of gas supplied to the component decreases.

8. The fuel cell system according to claim 6, wherein:
if an amount of ice generated in the component is smaller than a predetermined amount, the freezing prediction unit is configured to set the threshold value higher as a difference between the amount of ice and the predetermined value decreases.

9. The fuel cell system according to claim 1, wherein:
the freezing prediction unit is configured to count a number of times of stopping the fuel cell in a state where a temperature of the fuel cell is lower than a freezing point; and
the operation execution unit is configured to execute the warm-up operation based on a counted number of times.

10. The fuel cell system according to claim 1, wherein:
the freezing prediction unit is configured to integrate a time in which a temperature of joined gas is lower than a predetermined temperature, the joined gas comprising gas supplied to the component and the discharged gas circulated by the component; and
the operation execution unit is configured to execute the warm-up operation based on an integrated time.

11. The fuel cell system according to claim 10, wherein:
the freezing prediction unit is configured to make the integrated time shorter as a current required by the fuel cell increases.

12. The fuel cell system according to claim 1, wherein:
during execution of the warm-up operation, the fuel cell is configured to generate power to supply a compressor, a cooling water pump, and a heater.

13. The fuel cell system according to claim 1, wherein:
the component includes a jet pump configured to suck the discharged gas and circulate sucked discharged gas to the fuel cell by increasing a flow velocity of a gas supplied from a supply source to the fuel cell.

14. The fuel cell system according to claim 1, wherein:
when the freezing of the component is predicted and the stop command has been received, the operation execution unit is configured to execute the warm-up operation before stopping the fuel cell system in response to the stop command.

15. The fuel cell system according to claim 1, wherein:
when the freezing of the component is predicted and the stop command has been received, the operation execution unit is configured to execute the warm-up operation after stopping the fuel cell in response to the stop command.

16. The fuel cell system according to claim 1, wherein:
during execution of the warm-up operation, power is supplied from the fuel cell to auxiliary machines configured to warm up the fuel cell to a temperature suitable for power generation.

17. The fuel cell system according to claim 1 wherein the operation execution unit comprises a warm-up operation unit configured to calculate a target current during the warm-up operation on the basis of auxiliary machine power consumption for warming up the fuel cell, and calculate a target pressure and a target flow rate of the cathode gas and a target pressure of the anode gas based on the target current, and the target current during the warm-up operation is greater than the target current calculated by the power generation unit to power the load.

18. The fuel cell system according to claim 1, wherein:
the load includes an electric motor arranged to drive a vehicle.

19. The fuel cell system according to claim 18, wherein:
the power generation control unit is configured to calculate the power generation request flow rate according to a demand of the electric motor.

20. The fuel cell system according to claim 1, wherein:
the detection unit comprises a temperature sensor configured to detect an outside air temperature.

21. A control method for a fuel cell system for supplying anode gas and cathode gas to a fuel cell and causing the fuel cell to generate power according to a load, the fuel cell system including a component configured to circulate discharged gas including anode gas or cathode gas discharged from the fuel cell to an inlet of the fuel cell, the control method comprising:
controlling a power generation state of the fuel cell based on the load;
predicting freezing of the component by detecting a temperature of the fuel cell system;
executing, while the fuel cell generates power, when the freezing of the component is predicted and a stop command to stop the power generation of the fuel cell has been received, a warm-up operation before stopping the fuel cell in response to the stop command,
wherein the controlling a power generation state includes calculating a flow rate of the cathode gas as a power generation request flow rate on the basis of the load;
comparing a warm-up request flow rate of the cathode gas and the power generation request flow rate;
setting the warm-up request flow rate as the flow rate of the cathode gas during the warm-up operation when the warm-up request flow rate is greater than the power generation request flow rate; and
setting the power generation request flow rate as the flow rate of the cathode gas during the warm-up operation when the power generation request flow rate is greater than the warm-up request flow rate.

22. A fuel cell system for supplying anode gas and cathode gas to a fuel cell and causing the fuel cell to generate power according to a load, comprising:
a jet pump configured to circulate discharged gas comprising anode gas or cathode gas discharged from the fuel cell to an inlet of the fuel cell; and
a controller programmed to:
control a power generation state of the fuel cell based on the load;
predict freezing of the jet pump with a temperature sensor configured to detect a temperature of the fuel cell system;
while the fuel cell generates power, when the freezing of the jet pump is predicted and a stop command to stop the power generation of the fuel cell has been received, execute a warm-up operation before stopping the fuel cell in response to the stop command,
wherein the controlling a power generation state includes calculating a flow rate of the cathode gas as a power generation request flow rate on the basis of the load;
compare a warm-up request flow rate of the cathode gas and the power generation request flow rate;
set the warm-up request flow rate as the flow rate of the cathode gas during the warm-up operation when the warm-up request flow rate is greater than the power generation request flow rate; and
set the power generation request flow rate as the flow rate of the cathode gas during the warm-up operation when the power generation request flow rate is greater than the warm-up request flow rate.

23. The fuel cell system according to claim 22, wherein the controller is configured to cause the fuel cell to generate power during the warm-up operation by increasing a rotational speed of a compressor.

* * * * *